(12) United States Patent
Agiwal et al.

(10) Patent No.: US 10,084,892 B2
(45) Date of Patent: Sep. 25, 2018

(54) SCHEME FOR TRANSMITTING AND RECEIVING INFORMATION IN WIRELESS COMMUNICATION SYSTEM

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 14/908,081

(22) PCT Filed: Jul. 25, 2014

(86) PCT No.: PCT/KR2014/006811
§ 371 (c)(1),
(2) Date: Jan. 27, 2016

(87) PCT Pub. No.: WO2015/012638
PCT Pub. Date: Jan. 29, 2015

(65) Prior Publication Data
US 2016/0165013 A1 Jun. 9, 2016

(30) Foreign Application Priority Data

Jul. 25, 2013 (IN) .............................. 890/KOL/2013

(51) Int. Cl.
*H04L 29/06* (2006.01)
*H04B 7/26* (2006.01)
(Continued)

(52) U.S. Cl.
CPC .......... *H04L 69/166* (2013.01); *H04B 7/2656* (2013.01); *H04W 28/06* (2013.01); *H04W 72/1263* (2013.01)

(58) Field of Classification Search
CPC ............ H04L 69/166; H04W 72/1263; H04W 28/06; H04B 7/2656
(Continued)

(56) References Cited

U.S. PATENT DOCUMENTS 8,578,240 B1 * 11/2013 Pathakota ........... H03M 13/091
714/758
9,172,659 B1 * 10/2015 Roitshtein ............. H04L 49/106
(Continued)

*Primary Examiner* — Christine Ng
(74) *Attorney, Agent, or Firm* — Jefferson IP Law, LLP

(57) ABSTRACT

A method for transmitting information in a transmission time interval by a device in a wireless communication system is provided. The method includes fragmenting the information into two or more information fragments, if a size of the information is greater than a transportable size of unit transmission resource used for transmission of the information; generating a protocol data unit (PDU) including fragmentation information and one of unfragmented information and a fragmented information fragment; and transmitting the PDU through the unit transmission resource. The fragmentation information includes an identity of a specific unit transmission resource within the at least one transmission time interval and fragmentation control (FC) information indicating at least one of whether the information is fragmented or not and a position of the fragmented information fragment within the two or more information fragments. The identity of the specific unit transmission resource is uniquely assigned within the transmission time interval.

20 Claims, 35 Drawing Sheets

(51) Int. Cl.
*H04W 28/06* (2009.01)
*H04W 72/12* (2009.01)

(58) Field of Classification Search
USPC .............................. 370/401, 473, 474, 476
See application file for complete search history.

(56) References Cited

U.S. PATENT DOCUMENTS

| | | | | |
|---|---|---|---|---|
| 2007/0041399 | A1* | 2/2007 | Wendling | H04N 5/4401 370/465 |
| 2007/0121567 | A1* | 5/2007 | Venkatachalam | H04L 5/023 370/343 |
| 2009/0150953 | A1* | 6/2009 | Oh | H04L 12/2801 725/111 |
| 2009/0154430 | A1* | 6/2009 | Guo | H04W 72/1257 370/336 |
| 2009/0232161 | A1 | 9/2009 | Yeo et al. | |
| 2009/0232162 | A1* | 9/2009 | Morimura | H04L 49/9094 370/476 |
| 2009/0252134 | A1* | 10/2009 | Schlicht | H04L 1/0015 370/338 |
| 2010/0278062 | A1* | 11/2010 | Abraham | H04W 72/085 370/252 |
| 2010/0285791 | A1* | 11/2010 | Pirskanen | H04W 74/002 455/422.1 |
| 2011/0110343 | A1* | 5/2011 | Venkatachalam | H04W 12/06 370/338 |
| 2011/0205972 | A1 | 8/2011 | Yuk et al. | |
| 2012/0163378 | A1 | 6/2012 | Kim et al. | |
| 2012/0281699 | A1* | 11/2012 | Jia | H04W 8/005 370/392 |
| 2012/0314719 | A1 | 12/2012 | Agiwal et al. | |
| 2013/0039273 | A1 | 2/2013 | Lee et al. | |

* cited by examiner

| Fragmentation Information | | |
|---|---|---|
| FC | Ch_Idx | Meaning |
| 00 | Current Discovery physical Channel index or Ignore or don't care | Unfragmented Case (600) |
| 01 | Next fragment's Discovery physical Channel index | First Fragment (602) |
| 10 | Next fragment's Discovery physical Channel index | Middle Fragment (604) |
| 11 | Current Discovery physical Channel index or reserved or don't care | Last Fragment (606) |

FIG.6A

| Fragmentation Information | | |
|---|---|---|
| FC | Ch_Idx | Meaning |
| 00 | Reserved | Reserved (610) |
| 01 | Current Discovery physical Channel index | Unfragmented (612) |
| 01 | Next fragment's Discovery physical Channel index | First Fragment (614) |
| 10 | Next fragment's Discovery physical Channel index | Middle Fragment (616) |
| 11 | Current Discovery physical Channel index or reserved or don't care | Last Fragment (618) |

FIG.6B

| Fragmentation Information | | |
|---|---|---|
| FC | Discovery Physical Channel Info | Meaning |
| 00 | Current Discovery physical Channel info or Ignore or don't care | Unfragmented Case (1000) |
| 01 | Next fragment's Discovery physical Channel info | First Fragment (1002) |
| 10 | Next fragment's Discovery physical Channel info | Middle Fragment (1004) |
| 11 | Current Discovery physical Channel info or Ignore or don't care | Last Fragment (1006) |

Discovery Physical Channel Info
Example: Sub frame number + Ch_idx

FIG.10A

| Fragmentation Information | | |
|---|---|---|
| FC | Discovery Physical Channel Info | Meaning |
| 00 | Reserved | Reserved (1010) |
| 01 | Current Discovery physical Channel info | Unfragmented (1012) |
| 01 | Next fragment's Discovery physical Channel info | First Fragment (1014) |
| 10 | Next fragment's Discovery physical Channel info | Middle Fragment (1016) |
| 11 | Current Discovery physical Channel info or Ignore or don't care | Last Fragment (1018) |

Discovery Physical Channel Info
Example: Sub frame number + Ch_idx

FIG.10B

| Fragmentation Information (Optimized case for 2 fragments) ||
|---|---|
| Ch_Idx | Meaning |
| FFFF | Unfragmented Case (1200) |
| Next fragment's Discovery Physical Channel index | First Fragment (1202) |
| Current fragment's Discovery Physical Channel index | Second Fragment (1204) |

FIG.12A

| Fragmentation Information (Optimized case for 2 fragments) ||
|---|---|
| Discovery Physical Channel Info | Meaning |
| FFFF | Unfragmented Case (1210) |
| Next fragment's Discovery Physical Channel info | First Fragment (1212) |
| Current fragment's Discovery Physical Channel info | Second Fragment (1214) |

| Discovery Physical Channel Info Example: Sub frame number + Ch_idx |
|---|

FIG.12B

| Fragmentation Information | | |
|---|---|---|
| FC | Ch_Idx | Meaning |
| 00 | Current Discovery physical Channel index or Ignore or don't care | Unfragmented Case (1300) |
| 01 | Current fragment's Discovery physical index | First Fragment (1302) |
| 10 | Current fragment's Discovery physical index | Middle Fragment (1304) |
| 11 | Previous fragment's Discovery physical index | Last Fragment (1306) |

FIG.13A

| Fragmentation Information | | |
|---|---|---|
| FC | Ch_Idx | Meaning |
| 00 | Reserved | Reserved (1310) |
| 01 | Current fragment's Discovery physical index | First Fragment (1312) |
| 10 | Previous fragment's Discovery physical index | Middle Fragment (1314) |
| 11 | Previous fragment's Discovery physical index | Last Fragment (1316) |
| 11 | Current Discovery physical index | Unfragmented Case (1318) |

FIG.13B

| Fragmentation Information | | |
|---|---|---|
| FC | Ch_Idx | Meaning |
| 00 | Current Discovery physical Channel index or Ignore or don't care | Unfragmented Case (1320) |
| 01 | Current fragment's Discovery physical index | First Fragment (1322) |
| 10 | Previous fragment's Discovery physical index | Middle Fragment (1324) |
| 10 | Previous fragment's Discovery physical index | Last Fragment (1326) |
| 11 | Reserved | Reserved (1328) |

FIG.13C

| Fragmentation Information | | |
|---|---|---|
| FC | Discovery Physical Channel Info | Meaning |
| 00 | Ignore or don't care | Unfragmented Case (1600) |
| 01 | Current fragment's Discovery physical channel info | First Fragment (1602) |
| 10 | Previous fragment's Discovery physical Channel info | Middle Fragment (1604) |
| 11 | Previous fragment's Discovery physical channel info | Last Fragment (1606) |

Discovery Physical Channel Info
Example: Sub frame number + Ch_idx

FIG.16A

| Fragmentation Information | | |
|---|---|---|
| FC | Discovery Physical Channel Info | Meaning |
| 00 | Reserved | Reserved (1610) |
| 01 | Current fragment's Discovery physical channel info | First Fragment (1612) |
| 10 | Previous fragment's Discovery physical Channel info | Middle Fragment (1614) |
| 11 | Previous fragment's Discovery physical Channel info | Last Fragment (1616) |
| 11 | Current Discovery physical channel info | Unfragmented Case (1618) |

Discovery Physical Channel Info
Example: Sub frame number + Ch_idx

FIG.16B

| Fragmentation Information |||
|---|---|---|
| FC | Discovery Physical Channel Info | Meaning |
| 00 | Current Discovery physical Channel info or Ignore or don't care | Unfragmented Case (1620) |
| 01 | Current fragment's Discovery physical channel info | First Fragment (1622) |
| 10 | Previous fragment's Discovery physical Channel info | Middle Fragment (1624) |
| 10 | Previous fragment's Discovery physical Channel info | Last Fragment (1626) |
| 11 | Reserved | Reserved (1628) |

Discovery Physical Channel Info
Example: Sub frame number + Ch_idx

FIG.16C

| Fragmentation Information (Optimized case for 2 fragments) ||
|---|---|
| Ch_Idx | Meaning |
| FFFF | Unfragmented Case (1800) |
| Current fragment's Discovery Physical Channel Index | First Fragment (1802) |
| Previous fragment's Discovery Physical index | Second Fragment (1804) |

FIG.18A

| Fragmentation Information (Optimized case for 2 fragments) ||
|---|---|
| Discovery Physical Channel Info | Meaning |
| FFFF | Unfragmented Case (1810) |
| Current fragment's Discovery Physical Channel Info | First Fragment (1812) |
| Previous fragment's Discovery Physical Channel info | Second Fragment (1814) |

Discovery Physical Channel Info
Example: Sub frame number + Ch_idx

SCHEME FOR TRANSMITTING AND RECEIVING INFORMATION IN WIRELESS COMMUNICATION SYSTEM

CROSS-REFERENCE TO RELATED APPLICATION(S)

This application is a U.S. National Stage application under 35 U.S.C. § 371 of an International application filed on Jul. 25, 2014 and assigned application number PCT/KR2014/006811, which claimed the benefit of an Indian patent application filed on Jul. 25, 2013 in the Indian Patent Office and assigned Serial number 890/KOL/2013, the entire disclosure of which is hereby incorporated by reference.

TECHNICAL FIELD

The present disclosure relates to a scheme for transmitting and receiving information between multiple devices via direct radio signals in a wireless communication system. More particularly, the present disclosure relates to a method and apparatus for transmitting and receiving discovery information in a wireless communication system.

BACKGROUND

In a wireless communication system supporting device-to-device (D2D) discovery, discovery resources for discovery may be periodically allocated.

FIG. 1 illustrates discovery resources allocated for discovery in a wireless communication system according to the related art.

Referring to FIG. 1, a base station (BS) may allocate discovery subframes 106 in every discovery resource cycle 100. The discovery resource cycle 100 may include a discovery resource interval 102 and a non-discovery resource interval 104.

The allocated discovery subframes 106 may be present in the discovery resource interval 102.

Each discovery subframe (e.g., a subframe 108) may include discovery physical channels 110 of a fixed size.

One discovery physical channel (e.g., a discovery physical channel 112) may span one or multiple discovery subframes. As an example, in FIG. 1, one discovery physical channel 112 spans one subframe 108.

One discovery physical channel 112 may carry one discovery protocol data unit (PDU). If a size of the discovery physical channel is large, the coverage (e.g., the distance over which the transmitted discovery physical channel can be received) of the discovery physical channel may be reduced, so a discovery physical channel of a small size may be used.

Discovery resources in the discovery resource interval 102 are common to all user equipment (UEs). In other words, discovery resources in the discovery resource interval 102 are UE-common.

Discovery information to be transmitted on a discovery physical channel may be generated in an application layer. Because there are many different types of applications, it is not possible to keep the discovery information in a fixed small size. In other words, each application may need to send discovery information (having an unfixed length) of a type, which is different from the type determined in the application layer.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting and receiving information.

Another aspect of the present disclosure is to provide a method for fragmenting information and transmitting the fragmented information, and a method for supporting correct reassembling of the information transmitted by being fragmented.

Another aspect of the present disclosure is to provide a method and apparatus for transmitting and receiving discovery information.

Another aspect of the present disclosure is to provide a method for fragmenting discovery information and transmitting the fragmented discovery information, and a method for supporting correct reassembling of the discovery information transmitted by being fragmented.

Another aspect of the present disclosure is to provide a method and apparatus in which even if a size of information is larger than the size in which the information can be carried or transported on one unit transmission resource, a user equipment (UE) transmits the information using a unit transmission resource of a fixed size in a lower layer.

In accordance with an aspect of the present disclosure, a method for transmitting information in at least one transmission time interval by a device in a wireless communication system is provided. The method includes fragmenting the information into two or more information fragments, if a size of the information is greater than a transportable size of a unit transmission resource used for transmission of the information, generating a protocol data unit (PDU) including fragmentation information and one of unfragmented information and a fragmented information fragment, and transmitting the PDU through the unit transmission resource, wherein the fragmentation information includes an identity of a specific unit transmission resource within the at least one transmission time interval and fragmentation control (FC) information indicating at least one of whether the information is fragmented or not and a position of the fragmented information fragment within the two or more information fragments, and wherein the identity of the specific unit transmission resource is uniquely assigned within the transmission time interval.

In accordance with another aspect of the present disclosure, a method for receiving information by a device in a wireless communication system is provided. The method includes receiving at least one PDU that is transmitted through a unit transmission resource in at least one transmission time interval, reading fragmentation information and one of the information and an information fragment from the PDU, and reassembling one of the information and the information fragment, at least one of which is included in the at least one PDU, using the fragmentation information, wherein if a size of the information is greater than a transportable size of the unit transmission resource, the information is fragmented into two or more information fragments, wherein the fragmentation information includes an identity of a specific unit transmission resource within the at least one transmission time interval and FC information indicating at least one of whether the information is fragmented or not and a position of the information fragment within the two or more information fragments, and wherein the identity of the specific unit transmission resource is uniquely assigned within the transmission time interval.

In accordance with another aspect of the present disclosure, a device for transmitting information in at least one transmission time interval in a wireless communication system is provided. The device includes a controller configured to fragment the information into two or more information fragments if a size of the information is greater than a transportable size of a unit transmission resource used for transmission of the information, and to generate a PDU including fragmentation information and one of unfragmented information and a fragmented information fragment, and a transceiver configured to transmit the PDU through the unit transmission resource, wherein the fragmentation information includes an identity of a specific unit transmission resource within the at least one transmission time interval and FC information indicating at least one of whether the information is fragmented or not and a position of the fragmented information fragment within the two or more information fragments, and wherein the identity of the specific unit transmission resource is uniquely assigned within the transmission time interval.

In accordance with another aspect of the present disclosure, a device for receiving information in a wireless communication system is provided. The device includes a transceiver configured to receive at least one PDU that is transmitted through a unit transmission resource in at least one transmission time interval, and a controller configured to read fragmentation information and one of the information and an information fragment from the PDU, and reassemble one of the information and the information fragment, at least one of which is included in the at least one PDU, using the fragmentation information, wherein if a size of the information is greater than a transportable size of the unit transmission resource, the information is fragmented into two or more information fragments, wherein the fragmentation information includes an identity of a specific unit transmission resource within the at least one transmission time interval and FC information indicating at least one of whether the information is fragmented or not and a position of the information fragment within the two or more information fragments, and wherein the identity of the specific unit transmission resource is uniquely assigned within the transmission time interval.

In accordance with another aspect of the present disclosure, a method for transmitting information in at least one transmission time interval by a device in a wireless communication system is provided. The method includes fragmenting the information into two or more information fragments, if a size of the information is greater than a transportable size of a unit transmission resource used for transmission of the information, generating a PDU including fragmentation information and one of unfragmented information and a fragmented information fragments, and transmitting the PDU through the unit transmission resource, wherein the fragmentation information includes an identifier of the device, a sequence number of one of the unfragmented information and the fragmented information fragment, and FC information indicating at least one of whether the information is fragmented or not and a position of the fragmented information fragment within the two or more information fragments.

In accordance with another aspect of the present disclosure, a method for receiving information by a device in a wireless communication system is provided. The method includes receiving at least one PDU that is transmitted through a unit transmission resource in at least one transmission time interval, reading fragmentation information and one of the information and an information fragment from the PDU, and reassembling one of the information and the information fragment, at least one of which is included in the at least one PDU, using the fragmentation information, wherein if a size of the information is greater than a transportable size of the unit transmission resource, the information is fragmented into two or more information fragments, and wherein the fragmentation information includes an identifier of the device, a sequence number of one of the unfragmented information and the information fragment, and FC information indicating at least one of whether the information is fragmented or not and a position of the information fragment within the two or more information fragments.

In accordance with another aspect of the present disclosure, there is provided a device for transmitting information in at least one transmission time interval in a wireless communication system. The device includes a controller configured to fragment the information into two or more information fragments, if a size of the information is greater than a transportable size of a unit transmission resource used for transmission of the information, and to generate a PDU including fragmentation information and one of unfragmented information and a fragmented information fragment, and a transceiver configured to transmit the PDU through the unit transmission resource, wherein the fragmentation information includes an identifier of the device, a sequence number of one of the unfragmented information and the fragmented information fragment, and FC information indicating at least one of whether the information is fragmented or not and a position of the fragmented information fragment within the two or more information fragments.

In accordance with another aspect of the present disclosure, a device for receiving information in a wireless communication system is provided. The device includes a transceiver configured to receive at least one PDU that is transmitted through a unit transmission resource in at least one transmission time interval, and a controller configured to read fragmentation information and one of the information and an information fragment from the PDU, and reassemble one of the information and the information fragment, at least one of which is included in the at least one PDU, using the fragmentation information, wherein if a size of the information is greater than a transportable size of the unit transmission resource, the information is fragmented into two or more information fragments, and wherein the fragmentation information includes an identifier of the device, a sequence number of one of the unfragmented information and the information fragment, and FC information indicating at least one of whether the information is fragmented or not and a position of the information fragment within the two or more information fragments.

In accordance with another aspect of the present disclosure, a method for transmitting information by a device in at least one transmission time interval in a wireless communication system is provided. The method includes fragmenting the information into two or more information fragments, if a size of the information is greater than a transportable size of a unit transmission resource used for transmission of the information, generating a PDU including an fragmented information fragment and fragmentation information, and transmitting at least two PDUs through consecutive unit transmission resources, wherein the fragmentation information included in the PDU includes FC information indicating at least one of whether the information is fragmented or not and a position of the fragmented information fragment within the two or more information fragments.

In accordance with another aspect of the present disclosure, a method for receiving information by a device in a wireless communication system is provided. The method includes receiving at least two PDUs that are transmitted through consecutive unit transmission resources in at least one transmission time interval, reading fragmentation information and one of the information and an information fragment from each of the at least two PDUs, and reassembling one of the information and the information fragment, at least one of which is included in each of the two PDUs, using the fragmentation information, wherein if a size of the information is greater than a transportable size of a unit transmission resource, the information is fragmented into two or more information fragments, wherein the fragmentation information includes FC information indicating at least one of whether the information is fragmented or not and a position of the information fragment within the two or more information fragments, and wherein each of the at least two PDUs includes information fragments transmitted from one device.

In accordance with another aspect of the present disclosure, a device for transmitting information in at least one transmission time interval in a wireless communication system is provided. The device includes a controller configured to fragment the information into two or more information fragments, if a size of the information is greater than a transportable size of a unit transmission resource used for transmission of the information, and to generate a PDU including an fragmented information fragment and fragmentation information, and a transceiver configured to transmit at least two PDUs through consecutive unit transmission resource, wherein the fragmentation information included in the PDU includes FC information indicating at least one of whether the information is fragmented or not and a position of the fragmented information fragment within the two or more information fragments.

In accordance with another aspect of the present disclosure, a device for receiving information in a wireless communication system is provided. The device includes a transceiver configured to receive at least two PDUs that are transmitted through consecutive unit transmission resources in at least one transmission time interval, and a controller configured to read fragmentation information and one of the information and an information fragment from each of the at least two PDUs, and to reassemble one of the information and the information fragment, at least one of which is included in each of the two PDUs, using the fragmentation information, wherein if a size of the information is greater than a transportable size of a unit transmission resource, the information is fragmented into two or more information fragments, wherein the fragmentation information includes FC information indicating at least one of whether the information is fragmented or not and a position of the information fragment within the two or more information fragments, and wherein each of the at least two PDUs includes information fragments transmitted from one device.

A transmitting UE may transmit fragmentation information about information fragments over a certain time interval, thereby reducing the size of the information for uniquely identifying physical channel information used for transmission.

A receiving UE may correctly reassemble multiple information fragments by using the fragmentation information that is transmitted by the transmitting UE along with the fragmentations of the discovery information being transmitted.

In the reverse chaining scheme of the present disclosure, a transmitting UE may generate the fragmentation information that the transmitting UE will transmit along with the information fragments to be transmitted, before starting the transmission, without waiting to chain (or connect) all fragments.

Discovery information fragments may be sequentially chained to each other using FC information and a channel index field.

In this way, a receiving UE may easily reassemble the fragments using the encoded fragmentation information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B illustrate fragmentation information encoded by a forward chaining scheme in the first method of the present disclosure;

FIGS. 10A and 10B illustrate fragmentation information that includes a subframe number during encoding of the forward chaining scheme in the first method of the present disclosure;

FIGS. 12A and 12B illustrate fragmentation information encoded for two fragments by the forward chaining scheme in the first method of the present disclosure;

FIGS. 13A to 13C illustrate examples of modifications of fragmentation information encoded by a reverse chaining scheme in the first method of the present disclosure;

FIGS. 16A to 16C illustrate fragmentation information that includes a subframe number during encoding of the reverse chaining scheme in the first method of the present disclosure;

FIGS. 18A and 18B illustrate fragmentation information encoded for two fragments by the reverse chaining scheme in the first method of the present disclosure;

Throughout the drawings, it should be noted that like reference numbers are used to depict the same or similar elements, features, and structures.

DETAILED DESCRIPTION

Figure 1:
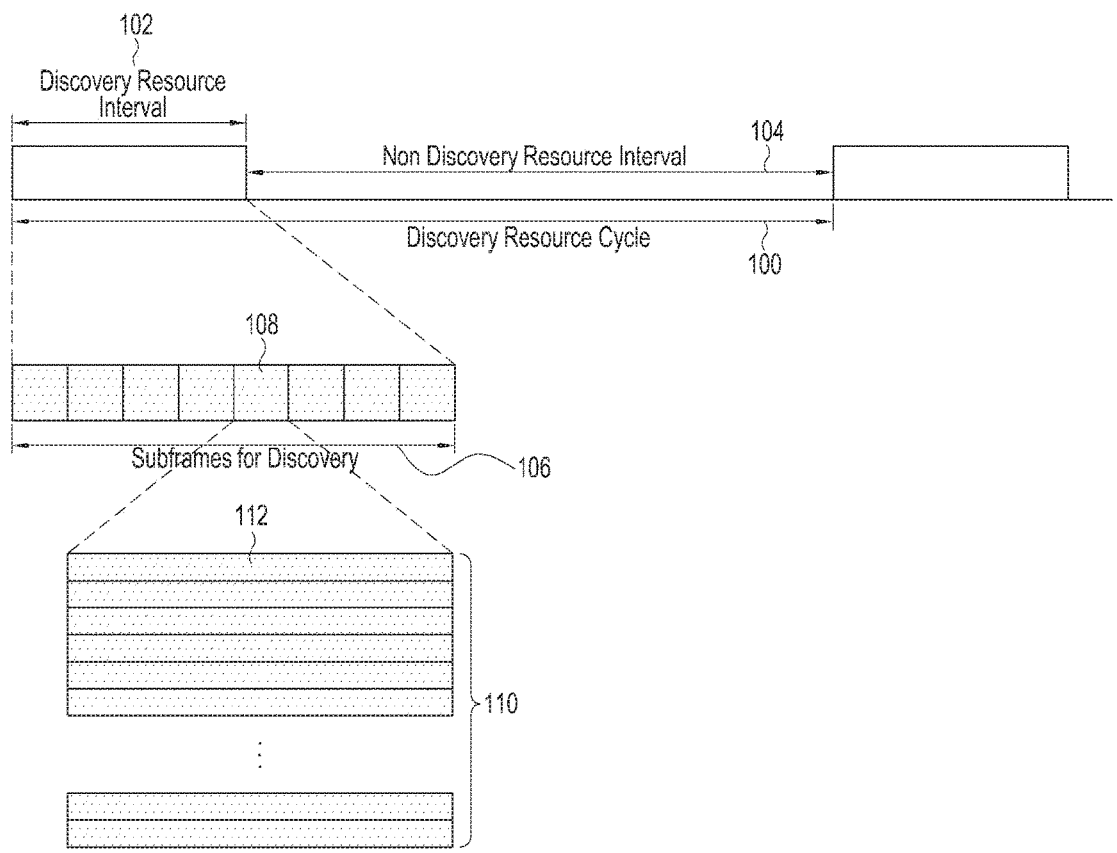
FIG. 1 illustrates discovery resources allocated for discovery in a wireless communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the present disclosure. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

Prior to a detailed description of the present disclosure, the interpretable meanings of some terms used herein will be presented. However, it should be noted that the terms are not limited to examples of the interpretations presented below.

A base station (BS), which is an entity communicating with a user equipment (UE), may refer to a node B (NB), an enhanced node B (eNB), an access point (AP), and the like.

A UE, which is an entity communicating with a BS, may refer to a mobile station (MS), a mobile equipment (ME), a device, a terminal, and the like. For example, a UE transmitting a signal will be referred to as a transmitting UE (Tx UE), and a UE receiving the signal will be referred to as a receiving UE (Rx UE).

In a wireless communication system providing services to multiple UEs, the transmission resources for transmitting signals may be used by the multiple UEs. Further, the transmission signals may be received by (or at) the multiple UEs. Although the detailed resource utilization method will be described herein with reference to examples of transmission of discovery information for convenience purpose only, the detailed mechanism of the present disclosure is not necessarily be limited to the discovery information. In other words, it should be noted that the resource utilization mechanism of the present disclosure may be applied to all kinds of signals transmitted/received by the UE.

There is no one-to-one connection between UEs during a discovery operation of the UE. Since sequence numbers (SNs) are not synchronized with each other between UEs during the discovery operation, a method of identifying each of fragments of fragmented discovery information by simply using only the SN may not be useful.

Therefore, the present disclosure provides a method and apparatus in which if a size of information (e.g., discovery information) that a Tx UE desires to transmit is greater than a size (e.g., a transportable size) in which the information can be carried over a unit physical channel (e.g., a discovery physical channel), the Tx UE fragments the information and transmits the fragmented information using a small physical channel of a fixed size in a lower layer.

Figure 2:
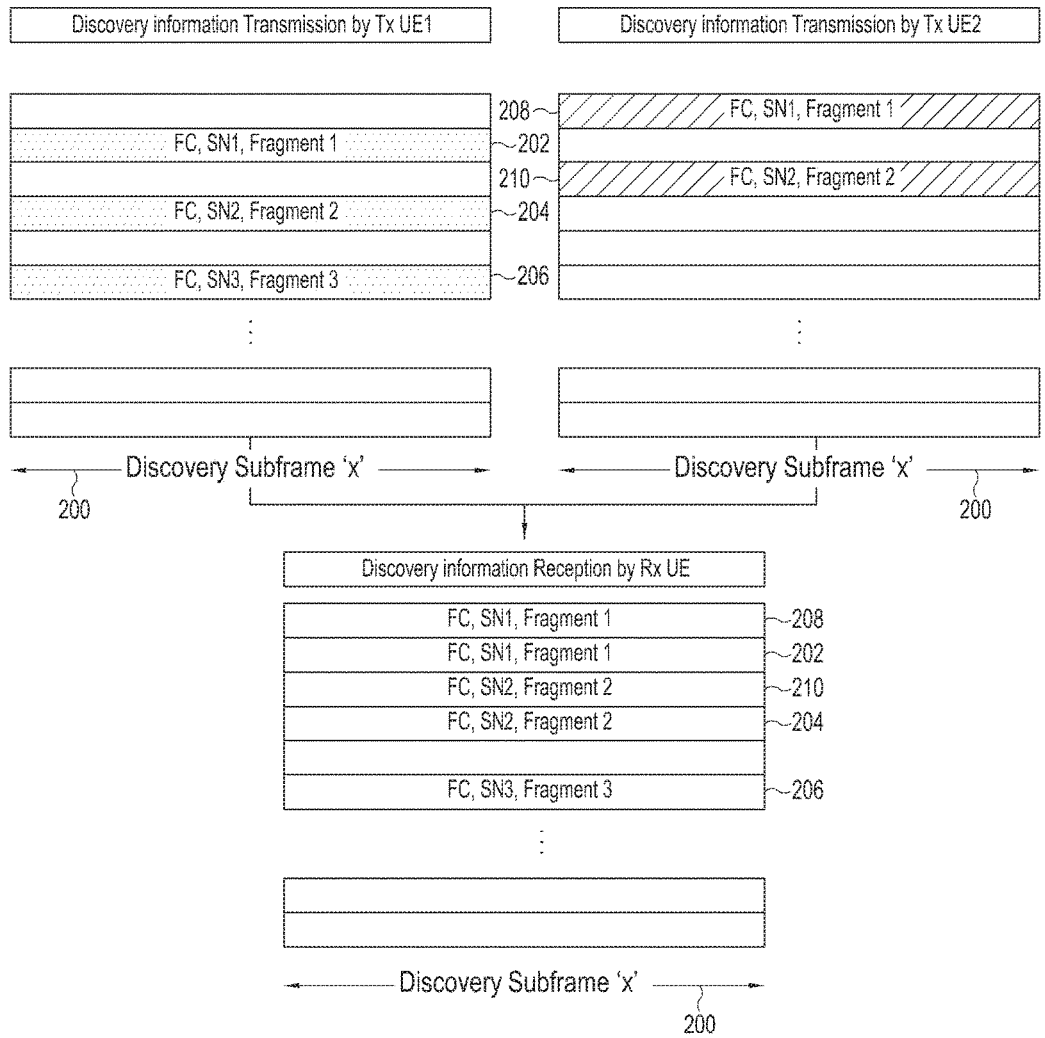
FIG. 2 schematically illustrates a method of fragmenting discovery information and identifying each of the fragments using a sequence number, and the transmission resources according thereto according to an embodiment of the present disclosure.

FIG. 2 schematically illustrates a method of fragmenting discovery information and identifying each of the fragments using an SN, and the transmission resources according to an embodiment of the present disclosure.

Referring to FIG. 2, it should be noted that the same subframe 200 is visually separated in FIG. 2, in order to show that different UEs (e.g., a Tx UE1 and a Tx UE2) transmit discovery information in a discovery subframe 'x' 200. In the discovery subframe 'x' 200, the Tx UE1 may transmit discovery information using three fragments 202, 204 and 206, which have SN1, SN2 and SN3, respectively. In the same discovery subframe 'x' 200, the Tx UE2 may transmit discovery information using two fragments 208 and 210, which have SN1 and SN2, respectively.

In the discovery subframe 'x' 200, an Rx UE may receive five fragments 208, 202, 210, 204 and 206 after decoding the discovery physical channel.

As described above, in the point-to-multi point (PMP) communication system, SNs are not synchronized between UEs. In addition, because the Rx UE cannot determine which fragments are related to the discovery information even though the Rx UE uses fragmentation control (FC) information and fragmentation information including SNs, the Rx UE may not reassemble the five fragments.

The present disclosure proposes three methods that support or enable a Rx UE to correctly reassemble fragments of one or more information (or signals) transmitted by a Tx UE.

A first method is a method of encoding at least one of information of a physical channel and FC information in each fragment as fragmentation information to be used for reassembling of the fragments. The first method will be described with various embodiments with reference to FIGS. 3 to 18B.

A second method is a method of encoding at least one of a Tx UE's identifier (e.g., TX-UE-ID), an SN of a fragment, and FC information in each fragment as fragmentation information to be used for reassembling of the fragments. The second method will be described in detail with reference to FIGS. 19A to 19C.

A third method is a method in which a Tx UE uses consecutive resources in using the resources (e.g., physical channels) required for transmission of information, thereby using only the FC information as fragmentation information to be used for reassembling of the fragments. The 'consecutive resources' may refer to two or more resources which are adjacent to each other. The third method will be described in detail with reference to FIGS. 20A and 20B.

First, the first method of supporting reassembling by an Rx UE for the information fragments transmitted by a Tx UE will be described.

Figure 3:
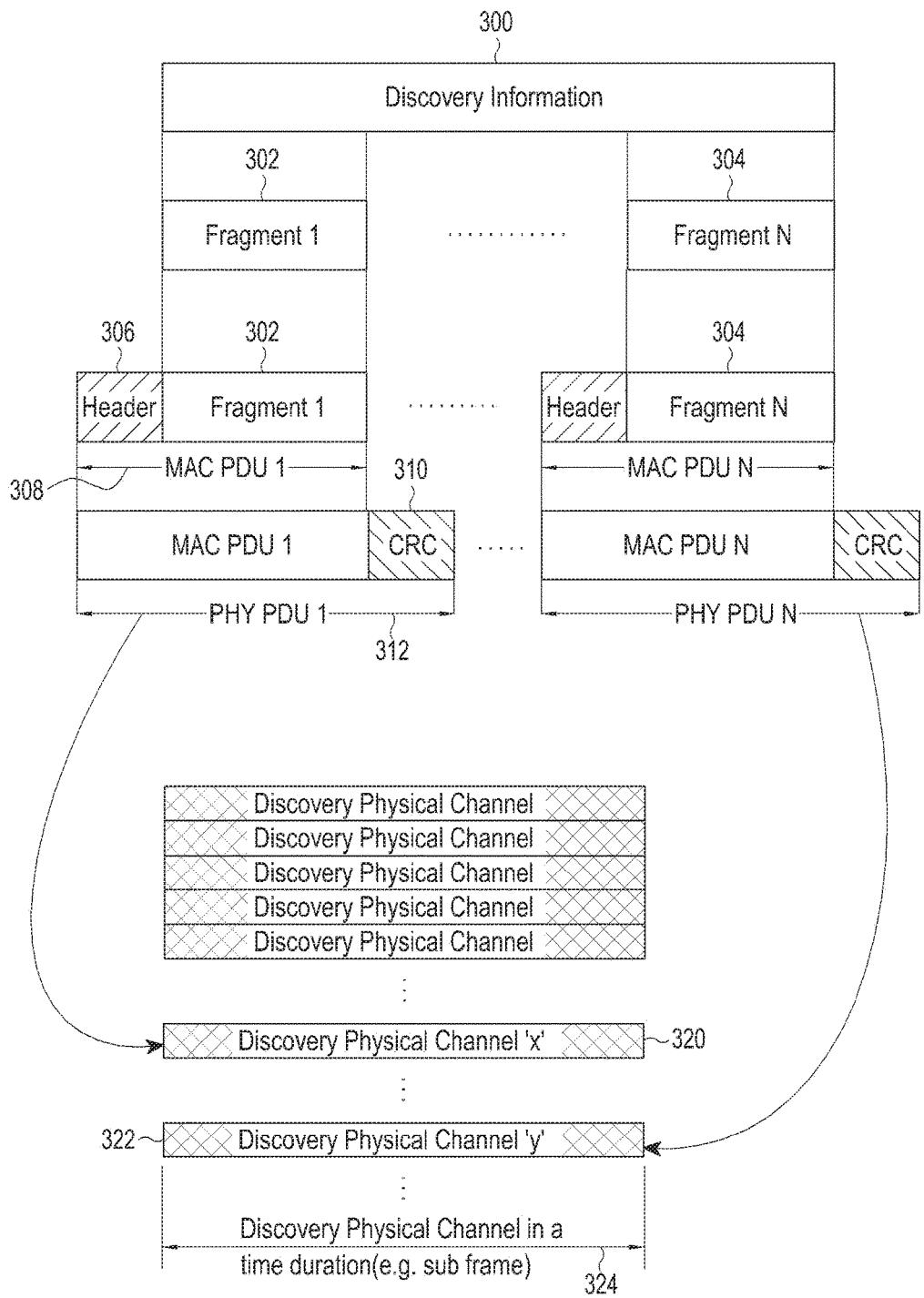
FIG. 3 illustrates a method of transmitting discovery information fragments using a discovery physical channel(s) of a fixed size and the resource structure thereof, according to a first method of the present disclosure.

FIG. 3 illustrates a method of transmitting discovery information fragments using a discovery physical channel(s) of a fixed size and the resource structure thereof, according to a first method of the present disclosure.

Referring to FIG. 3, discovery information 300 may be fragmented into N fragments 302 and 304. Herein, N will be greater than 1, if a size of the discovery information 300 is greater than the size in which the discovery information 300 can be carried over one discovery physical channel.

One discovery information fragment 302 may become one media access control (MAC) protocol data unit (PDU) 308, as a fragment header 306 is added thereto. In addition, the MAC PDU 308 may become one physical (PHY) PDU 312, as a cyclic redundancy check (CRC) part 310 is added thereto. The PHY PDU 312 including the discovery information fragment 302 may be transmitted over a discovery physical channel. In other words, each of the discovery information fragments 302 and 304 may be transmitted over one discovery physical channel. For example, the discovery information fragment 302 may be transmitted over a discovery physical channel 'X' 320, and the discovery information fragment 304 may be transmitted over a discovery physical channel 'Y' 322.

The discovery information fragments 302 and 304 may be transmitted in sequence.

Because the size of one discovery physical channel is fixed, the number of fragments for given discovery information and the size of each fragment may also be fixed.

A duration 324, which is occupied by one discovery physical channel, may be referred to as a discovery transmission time interval. For example, the discovery transmission time interval may correspond to one subframe (e.g., 1 ms) or multiple subframes.

The fragments of the discovery information may be transmitted over a unit period in which all discovery physical channels may be uniquely identified. In an embodiment, the unit period may be one discovery transmission time interval in a discovery resource cycle. In an embodiment, the unit period may be multiple discovery transmission time intervals in one discovery resource cycle. In an embodiment, the unit period may be multiple discovery transmission time intervals spanning discovery resource cycles.

Figure 4:
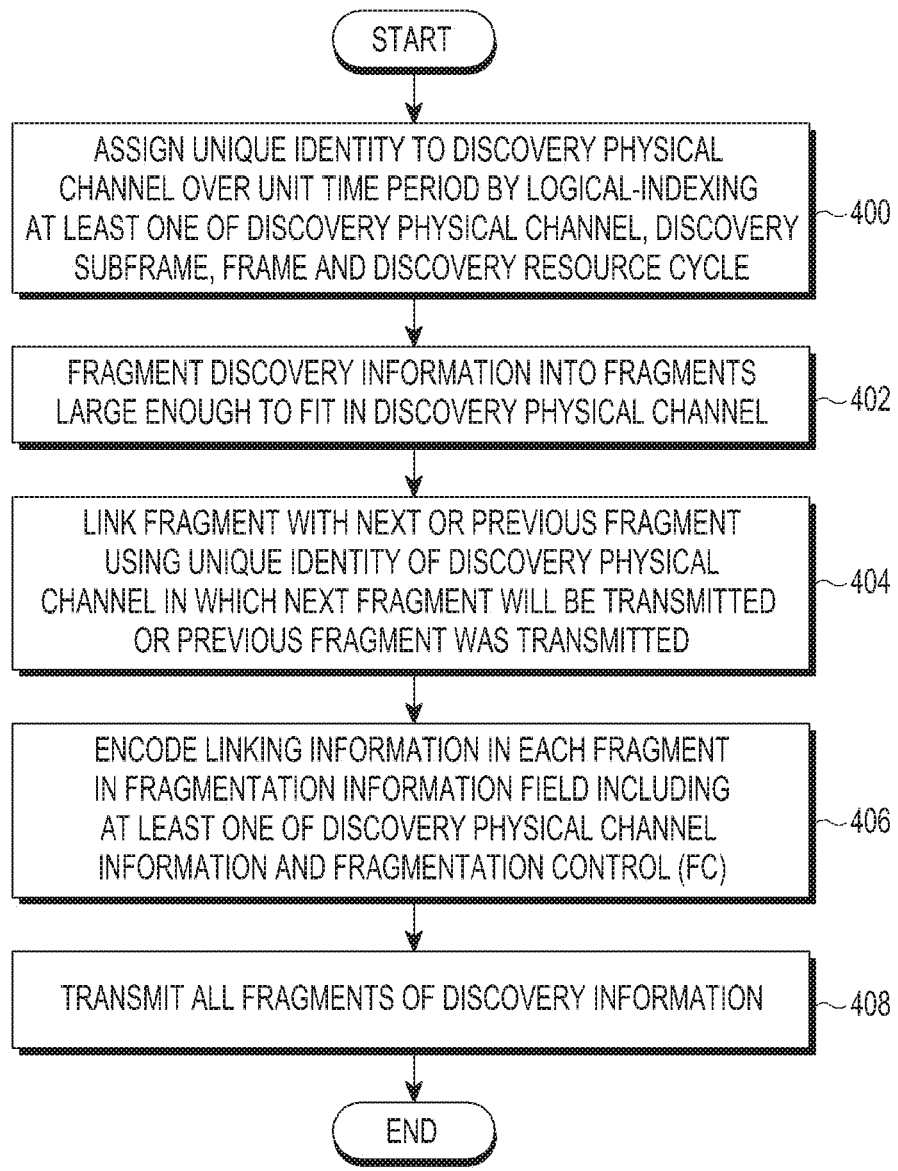
FIG. 4 illustrates a method of transmitting discovery information fragments according to the first method of the present disclosure.

FIG. 4 illustrates a method of transmitting discovery information fragments according to the first method of the present disclosure.

Referring to FIG. 4, the method of transmitting discovery information fragments according to the first method of the present disclosure may include at least one of the following steps (or operations).

In operation 400, a Tx UE may assign an identity to resources for transmitting discovery information over a unit period. Specifically, the Tx UE may assign a unique identity (or ID) to a discovery physical channel over a predefined unit period, by logical-indexing or numbering at least one of a discovery physical channel within one discovery transmission time interval, the discovery transmission time interval, and a discovery resource cycle.

For example, if the unit period is defined as one discovery transmission time interval, the discovery transmission time interval may include k subframes, and if N discovery physical channels are present over one subframe, the Tx UE may assign a unique identity to each of N*k physical channels. It will be apparent to those of ordinary skill in the art that different physical channels having the same identity may be present in different discovery transmission time intervals.

In operation 402, the Tx UE may fragment the discovery information into fragments large enough to fit in a discovery physical channel.

In operation 404, the Tx UE may link each discovery information fragment with a next fragment (or a previous fragment) using information (e.g., a unique ID) of a discovery physical channel over which the next fragment (or the previous fragment) is to be transmitted. In the present disclosure, linking an arbitrary fragment with the next fragment for the arbitrary fragment will be referred to as forward chaining. On the contrary, linking an arbitrary fragment with the previous fragment for the arbitrary fragment will be referred to as reverse chaining.

In operation 406, the Tx UE may encode information about a link between fragments in a fragmentation information field of each fragment. The fragmentation information field may include at least one of discovery physical channel information and FC information.

In operation 408, the Tx UE may transmit fragments of the discovery information. In this case, the discovery information fragments may be transmitted in sequence. Alternatively, the discovery information may be discovery information for a predetermined time interval. In other words, the Tx UE may transmit fragments of the discovery information for the predetermined time interval. The Tx UE may reduce the size of information for uniquely identifying the physical channel information used for the transmission, by transmitting fragmentation information about the discovery information fragments over a certain time interval. If the discovery information is not limited to a certain time interval, the size of the information for identifying a physical channel may increase, and a discovery information waiting time of the Rx UE may increase.

In the case of the forward chaining, the Tx UE may determine discovery physical channel information of the current fragment and the next fragment, encode in the current fragment the fragmentation information obtained by chaining the current fragment and the next fragment, and transmit the results. However, it should be noted that in the case of the reverse chaining, the Tx UE does not need to wait to chain all fragments before starting the transmission. In the case of the reverse chaining, the Tx UE may determine a discovery physical channel of the current fragment, encode in the current fragment the fragmentation information obtained by chaining the current fragment to the fragment that was transmitted before the current fragment, and transmit the results. In other words, in the case of the reverse chaining, the Tx UE does not require the time for waiting to determine physical channel information of the next fragment.

Figure 5:
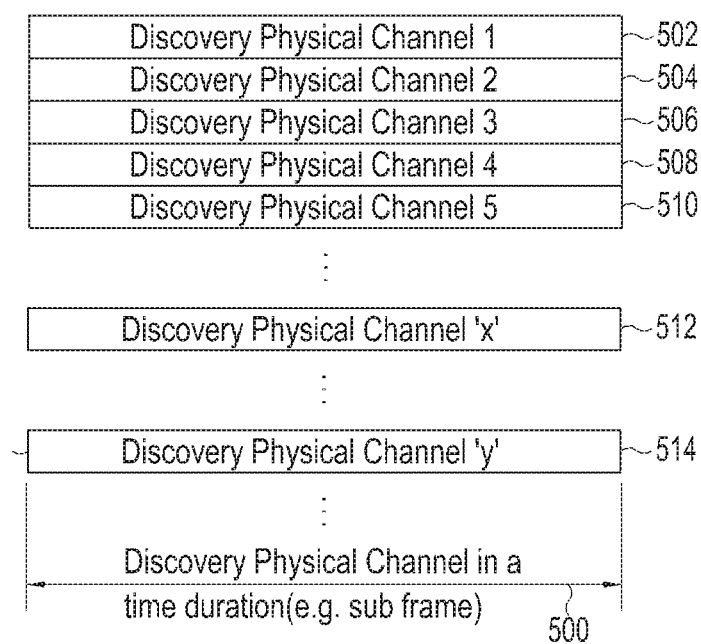
FIG. 5 illustrates an example of identifying discovery physical channels using logical indexing in the first method of the present disclosure.

FIG. 5 illustrates an example of identifying discovery physical channels using logical indexing in the first method of the present disclosure.

Referring to FIG. 5, logical indexing may be performed on discovery physical channels 502, 504, 506, 508, 510, 512 and 514 within one unit period (e.g., one discovery transmission time interval 500).

If discovery information fragments are transmitted using discovery physical channels in one discovery transmission time interval, discovery physical channels 502, 504, 506, 508, 510, 512 and 514 corresponding to the discovery information fragments may be uniquely identified using discovery physical channel indexes. For example, the discovery physical channels 502, 504, 506, 508, 510, 512 and 514 may be indexed with values of '1', '2', '3', '4', '5', 'X' and 'Y', respectively. The values of the logical indexes may be known to both of the Tx UE(s) and the Rx UE(s).

If discovery information fragments are transmitted using discovery physical channels within multiple discovery transmission time intervals, discovery physical channels corresponding to the discovery information fragments may be uniquely identified using information (e.g., a discovery transmission time interval number) for identifying a discovery transmission time interval and the discovery physical channel indexes.

If discovery information fragments are transmitted using discovery physical channels within multiple discovery transmission time intervals of multiple discovery resource cycles, discovery physical channels corresponding to the discovery information fragments may be uniquely identified using information (e.g., a discovery resource cycle number) for identifying a discovery resource cycle, a discovery transmission time interval number, and the discovery physical channel indexes.

In various embodiments, a discovery transmission time interval may be identified using a frame number and/or a subframe number. Each frame may have a fixed number of subframes, and the discovery transmission time interval may be equivalent to one or more subframes.

In an embodiment of the present disclosure, fragmentation information including FC bits and a discovery physical channel index Ch_idx may be encoded along with the discovery information fragment in a discovery information fragment header.

FIGS. 6A and 6B illustrate fragmentation information encoded by a forward chaining scheme in the first method of the present disclosure.

Referring to FIGS. 6A and 6B, it will be assumed in this embodiment that all fragments of discovery information are transmitted within one discovery transmission time interval (e.g., one subframe).

In the encoding method of FIG. 6A, if discovery information is unfragmented (600), an FC field may be set to 0 (e.g., '00') in a fragment header. In this case, a channel index Ch_idx may be set as a discovery physical channel index of a discovery physical channel over which the unfragmented discovery information is transmitted. Alternatively, the Ch_idx may be set to 0s, or may be set to ignorable other values.

For a first discovery information fragment (602), the FC field may be set to 1 (e.g., '01') in a fragment header. In this case, the Ch_idx may be set as a discovery physical channel index of a discovery physical channel over which the next discovery information fragment is transmitted.

For a middle (other than the first and last) discovery information fragment (604), the FC field may be set to 2 (e.g., '10') in a fragment header. In this case, the Ch_idx may be set as a discovery physical channel index of a discovery physical channel over which the next discovery information fragment is transmitted.

For a last discovery information fragment (606), the FC field may be set to 3 (e.g., '11') in a fragment header. In this case, the Ch_idx may be set as a discovery physical channel index of a discovery physical channel over which the last discovery information fragment is transmitted. Alternatively, the Ch_idx may be set to 0s, may be set to ignorable other values, or may be reserved without being used.

It should be noted herein that the FC values of 0, 1, 2 and 3 are used for the purpose of examples only. Those skilled in the art may use values other than the exampled ones.

In the encoding method of FIG. 6B, a value 0 (e.g., '00') of the FC field may be reserved for another case (610).

If discovery information is unfragmented (612), the FC field may be set to 1 (e.g., '01') in a fragment header. In this case, the Ch_idx may be set as a discovery physical channel index of a discovery physical channel over which the unfragmented discovery information is transmitted.

For a first discovery information fragment (614), the FC field may be set to 1 (e.g., '01') in a fragment header. In this case, the Ch_idx may be set as a discovery physical channel index of a discovery physical channel over which the next discovery information fragment is transmitted. In the encoding method of FIG. 6B, a value 1 (e.g., '01') of the FC field may be equally used for the unfragmented discovery information fragment and the first discovery information fragment.

For a middle (other than the first and last) discovery information fragment (616), the FC field may be set to 2 (e.g., '10') in a fragment header. In this case, the Ch_idx may be set as a discovery physical channel index of a discovery physical channel over which the next discovery information fragment is transmitted.

For a last discovery information fragment (618), the FC field may be set to 3 (e.g., '11') in a fragment header. In this case, the Ch_idx may be set as a discovery physical channel index of a discovery physical channel over which the last discovery information fragment is transmitted. Alternatively, the Ch_idx may be set to 0s, may be set to ignorable other values, or may be reserved.

It should be noted herein that the FC values of 0, 1, 2 and 3 are used for the purpose of examples only. Those skilled in the art may use values other than the exampled ones.

Figure 7A:
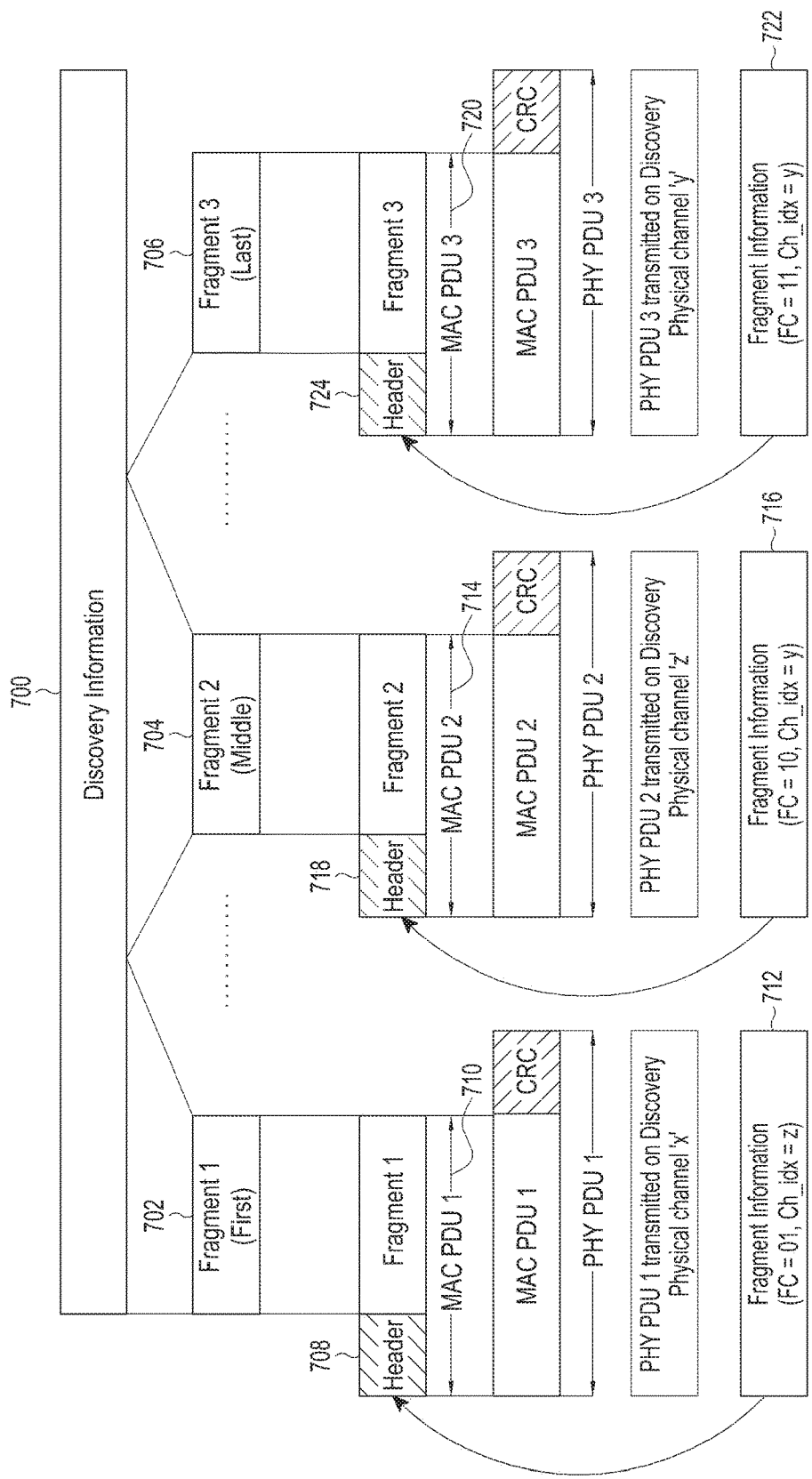
FIGS. 7A to 7C illustrate a method of fragmenting discovery information using encoding of the forward chaining scheme in the first method of the present disclosure.
Figure 7B:
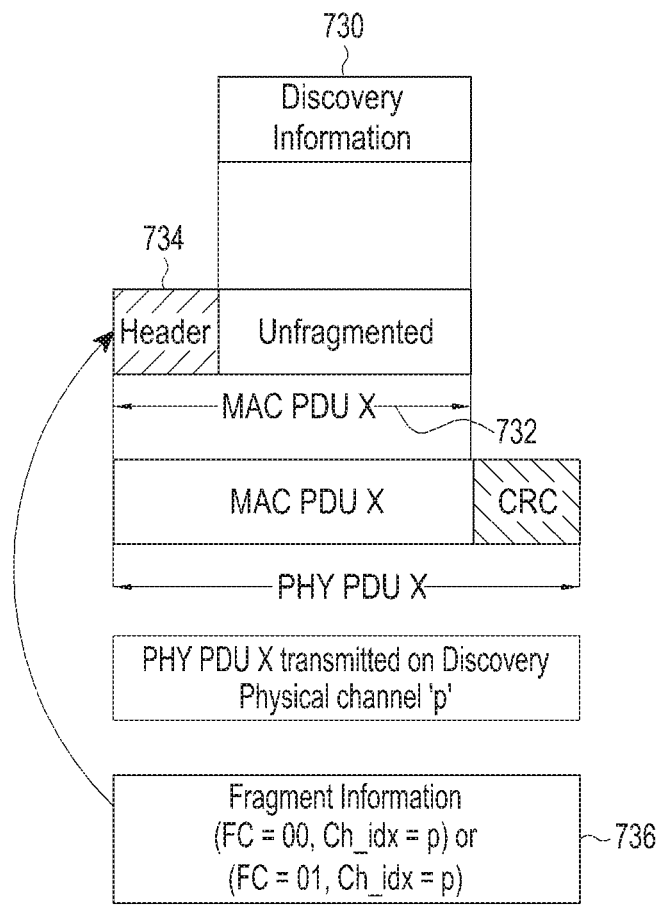
Figure 7C:
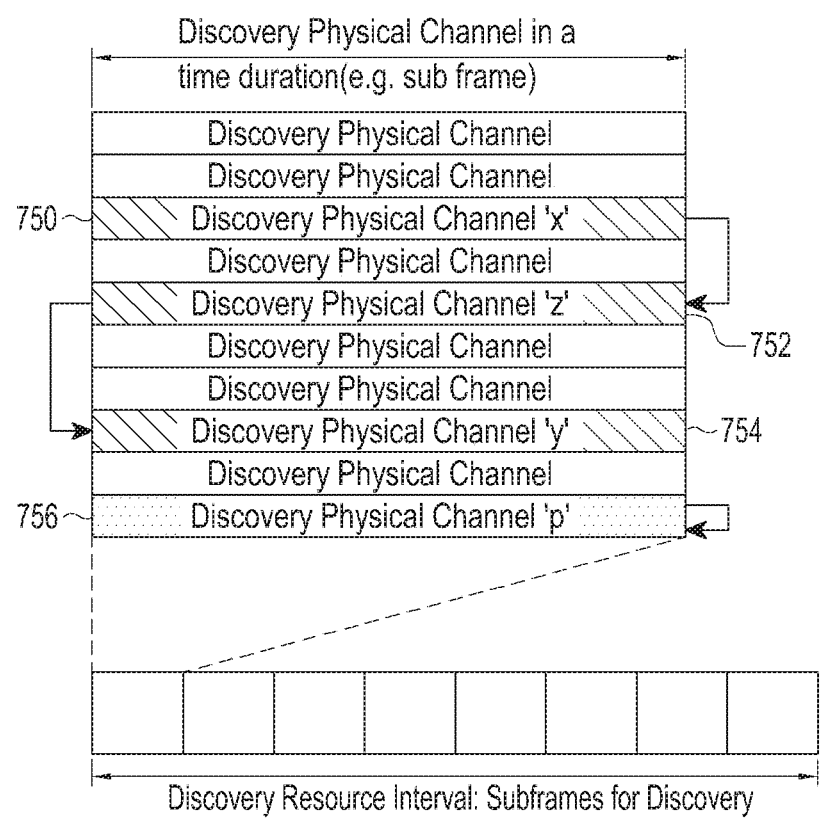

FIGS. 7A to 7C illustrate a method of fragmenting discovery information using encoding of the forward chaining scheme in the first method of the present disclosure.

FIG. 7A illustrates fragmentation information encoded in fragments when discovery information 700 is fragmented into three fragments 702, 704 and 706.

The three fragments 702, 704 and 706 may be transmitted over discovery physical channels 750, 752 and 754 (of FIG. 7C) having channel indexes x, z and y, respectively.

A header 708 of a MAC PDU 710 carrying the first discovery information fragment 702 may include fragmentation information 712. FC and Ch_idx, which may be included in the fragmentation information 712, are set to 1 (e.g., '01') and 'z', respectively. In other words, the Ch_idx may be set as a discovery physical channel index of the second discovery information fragment 704.

A header 718 of a MAC PDU 714 carrying the second discovery information fragment 704 may include fragmentation information 716. FC and Ch_idx, which may be included in the fragmentation information 716, are set to 2 (e.g., '10') and 'y', respectively. In other words, the Ch_idx may be set as a discovery physical channel index of the third discovery information fragment 706.

A header 724 of a MAC PDU 720 carrying the third discovery information fragment 706 (e.g., the last discovery information fragment) may include fragmentation information 722. FC and Ch_idx, which may be included in the fragmentation information 722, are set to 3 (e.g., '11') and 'y', respectively. In other words, the Ch_idx may be set as a discovery physical channel index of the third discovery information fragment 706.

FIG. 7B illustrates fragmentation information encoded when discovery information is unfragmented.

Unfragmented discovery information 730 may be transmitted over a discovery physical channel 756 with an index 'p'. A header 734 of a MAC PDU 732 carrying the unfragmented discovery information 730 may include fragmentation information 736. FC and Ch_idx, which may be included in the fragmentation information 736, are set to 0 (e.g., '00') or 1 (e.g., '01') and to 'p', respectively.

FIG. 7C illustrates the structure in which a fragmented discovery information fragment or an unfragmented discovery information fragment is transmitted over one or more discovery physical channels.

It can be seen from FIG. 7C that discovery information fragments are sequentially chained to each other using the FC and Ch_idx fields.

By using the FC and Ch_idx fields, an Rx UE may identify discovery physical channels over which fragmented discovery information fragments are transmitted, and may sequentially reassemble the discovery information fragments which are transmitted over the discovery physical channels. For example, upon reading the discovery physical channel 750 carrying the first discovery information fragment 702, the Rx UE may obtain the fragmentation information included in the header 708, and know the presence/absence of the next discovery information fragment and the information (e.g., Ch_idx=z) of the discovery physical channel 752 over which the next discovery information fragment is transmitted. Therefore, the Rx UE may obtain the next discovery information fragment 704 from the discovery physical channel 752 with an index 'z'. Similarly, based on the fragmentation information 716 included in the header 718 of the next discovery information fragment 704, the Rx UE may know the presence/absence of the last discovery information fragment 706 and the information (e.g., Ch_idx=y) of the discovery physical channel 754 over which the last discovery information fragment 706 is transmitted.

In this way, using the encoded fragmentation information, the Rx UE may easily reassemble the discovery information fragments into discovery information.

Figures 8A, 8B, 8C:
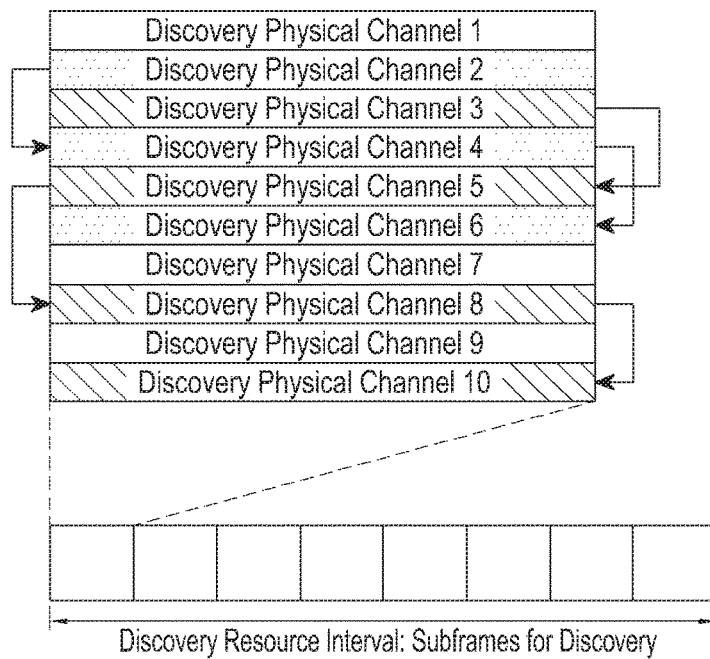
FIGS. 8A to 8C illustrate various methods of fragmenting discovery information using encoding of the forward chaining scheme in the first method of the present disclosure.

FIGS. 8A to 8C illustrate various methods of fragmenting discovery information using encoding of the forward chaining scheme in the first method of the present disclosure.

FIG. 8A illustrates fragmentation information encoded when discovery information 1 is fragmented into four fragments. The discovery information 1 may be fragmented into four fragments, which are transmitted using discovery physical channels 3, 5, 8 and 10.

FIG. 8B illustrates fragmentation information encoded when discovery information 2 is fragmented into three fragments. The discovery information 2 may be fragmented into three fragments, which are transmitted using discovery physical channels 2, 4 and 6.

Referring to FIGS. 8A and 8B, the discovery information 1 may be transmitted by a Tx UE1, and the discovery information 2 may be transmitted by a Tx UE2.

FIG. 8C illustrates a connection (or chain) relationship by the forward chaining scheme between discovery physical channels when fragmented discovery information fragments are transmitted over multiple discovery physical channels.

Referring to FIG. 8C, the proposed encoding of fragmentation information may chain the fragments of the discovery information 1 and the discovery information 2 to each other. In other words, the fragmentation information encoded in discovery information fragments may enable an Rx UE to reassemble the fragments into the discovery information.

Figure 9A:
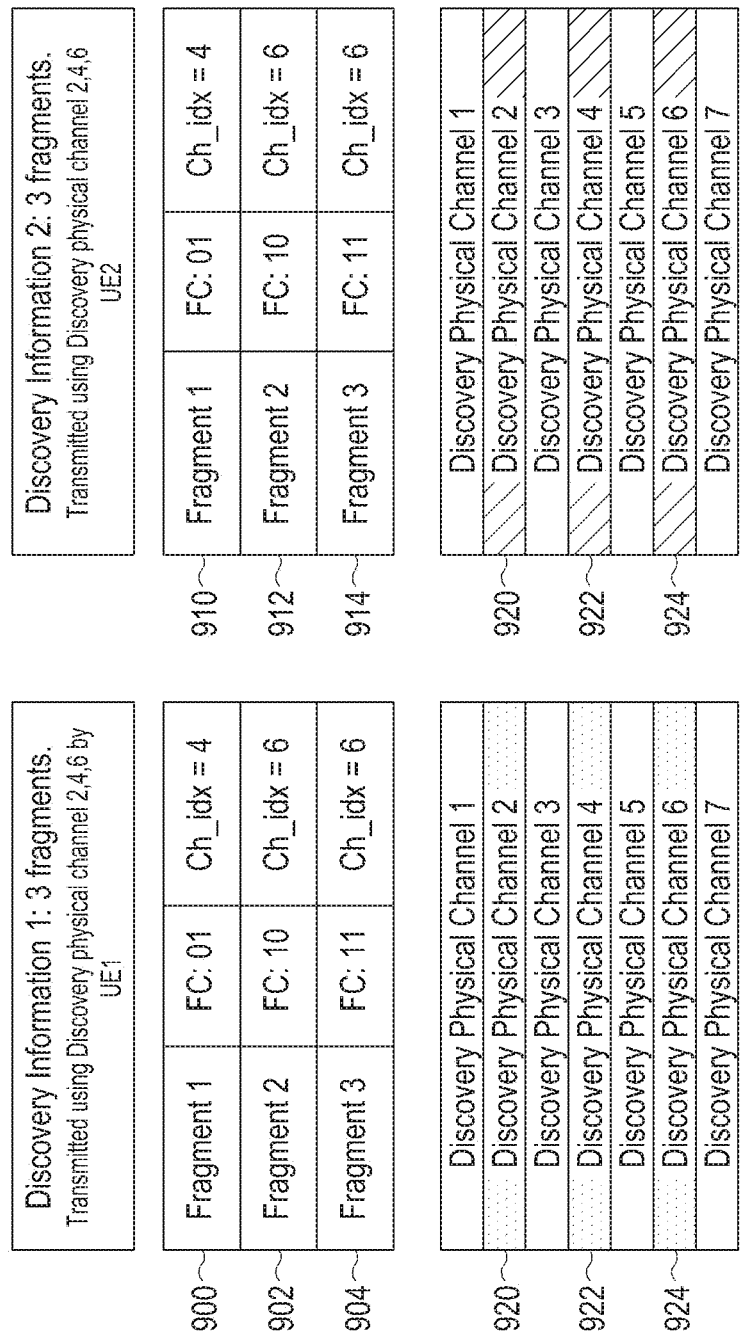
FIGS. 9A and 9B illustrate fragmentation information and transmission resources when discovery information transmitted from multiple transmitting user equipment (Tx UEs) collides with each other, in the first method of the present disclosure.
Figure 9B:
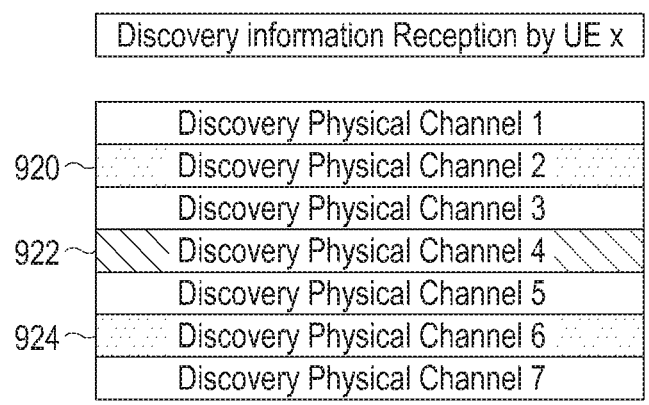

FIGS. 9A and 9B illustrate fragmentation information and transmission resources when discovery information transmitted from multiple Tx UEs collides with each other, in the first method of the present disclosure.

FIG. 9A illustrates an example in which two Tx UEs transmit their discovery information fragments using the same discovery physical channels.

Discovery physical channels may be selected from common discovery resources by multiple UEs. Therefore, in some cases, two Tx UEs UE1 and UE2 may select the same discovery physical channels to transmit the discovery information. When two Tx UEs transmit discovery information having the same number of fragments using the same discovery physical channels, the following problems may occur.

For example, the Tx UE1 and the Tx UE2 may transmit discovery information 1 and discovery information 2, respectively. The discovery information 1 and 2 each may be fragmented into three fragments. The Tx UE1 may transmit fragments 900, 902 and 904 of the discovery information 1 using a discovery physical channel #2 920, a discovery physical channel #4 922 and a discovery physical channel #6 924, and the Tx UE2 may also transmit fragments 910, 912 and 914 of the discovery information 2 using the discovery physical channel #2 920, the discovery physical channel #4 922 and the discovery physical channel #6 924. In this scenario, the transmission of the discovery information by the Tx UE1 and UE2 may collide with each other.

FIG. 9B illustrates an example in which an Rx UE receives discovery information fragments which have undergone collision.

Commonly, the occurrence probability of this scenario is very low, so the Rx UE UEx may receive nothing if the collision occurs.

However, when the collision occurs, the Rx UEx may receive fragments over the discovery physical channel #2 920, the discovery physical channel #4 922 and the discovery physical channel #6 924, and if the fragments received on the discovery physical channel #2 920 and the discovery physical channel #6 924 belong to the discovery information from the Tx UE1 and the fragments received on the discovery physical channel #4 922 belong to the discovery information from the Tx UE2, then the Rx UEx may reassemble wrong fragments into discovery information, because the Rx UEx knows nothing about the origin of the fragments. In other words, the Rx UEx may simply reassemble the three fragments depending on the fragmentation information.

The Rx UEx may detect (or determine) that the discovery information reassembled using the fragments is not correct, through one of the following ways.

A first way is a way to apply the integrity protection check to the reassembled discovery information. If security (e.g., integrity protection check) operates in the Rx UEx, the reassembled fragments will fail the integrity protection check, so the Rx UEx may determine that the reassembled discovery information is incorrect information.

A second way is a way to apply the CRC check for discovery information fragments during transmission. The CRC check in the Rx UEx for the fragments reassembled including the wrong fragments will fail.

A third way is a way to use hierarchical CRC that applies a CRC for the fragments. A CRC for an n-th fragment is generated using the hierarchical (n−1)-th and n-th fragments (where n>1). In this case, the Rx UEx may fail the CRC check.

A fourth way is a way to apply a hierarchical CRC mask to the fragments. A CRC for an n-th fragment may be generated using a CRC mask and the CRC mask may be a CRC of an (n−1)-th fragment. In this case, the Rx UEx may fail the CRC check.

A fifth way is a way to encode an identifier TX-UE-ID of the Tx UE in each discovery information fragment, allowing the Rx UE to use the TX-UE-ID. The TX-UE-ID may be encoded in each discovery information fragment. Upon detecting that TX-UE-ID of a discovery information fragment transmitted over a discovery physical channel does not match with the identifier of the Tx UE, the Rx UE may determine that the discovery information to be reassembled is wrong information. In other words, by using the TX-UE-ID, the Rx UEx may not use the wrong fragments (e.g., discovery information fragments from another UE) in reassembling of the discovery information.

FIGS. 10A and 10B illustrate fragmentation information that includes a subframe number during encoding of the forward chaining scheme in the first method of the present disclosure.

Referring to FIGS. 10A and 10B, in this embodiment, fragmentation information may be encoded along with a discovery information fragment in a discovery information fragment header, and the fragmentation information may include FC bits and discovery physical channel information.

It will be assumed in this embodiment that the fragments of the fragmented discovery information are transmitted in the same or different discovery transmission time intervals. In other words, discovery physical channels used for transmission of the discovery information fragments may be transmitted in different subframes. Therefore, in this embodiment, the discovery physical channel information may include a subframe number and a channel index Ch_idx.

In the encoding method of FIG. 10A, if discovery information is unfragmented (1000), an FC field may be set to 0 (e.g., '00') in a fragment header. In this case, the discovery physical channel information may be set as discovery physical channel information (e.g., a channel index and a channel number) of a discovery physical channel over which the unfragmented discovery information is transmitted. Alternatively, the discovery physical channel information may be set to values such as 0 which is ignorable. The reason for setting a value of the discovery physical channel information to a value such as 0 is that there is no discovery physical channel for the next fragment to be indicated since the discovery information is unfragmented.

For a first discovery information fragment (1002), the FC field may be set to 1 (e.g., '01') in a fragment header. In this case, the discovery physical channel information may be set as discovery physical channel information of a discovery physical channel over which the next discovery information fragment is transmitted.

For a middle (other than the first and last) discovery information fragment (1004), the FC field may be set to 2 (e.g., '10') in a fragment header. In this case, the discovery physical channel information may be set as discovery physical channel information of a discovery physical channel over which the next discovery information fragment is transmitted.

For a last discovery information fragment (1006), the FC field may be set to 3 (e.g., '11') in a fragment header. In this case, the discovery physical channel information may be set as discovery physical channel information of a discovery physical channel over which the last discovery information fragment is transmitted. Alternatively, the discovery physical channel information may be set to values such as 0 which is ignorable (because there is no discovery physical channel of the next fragment to be indicated).

It should be noted herein that the FC values of 0, 1, 2 and 3 are used for the purpose of examples only. Those skilled in the art may use values other than the exampled ones.

In the encoding method of FIG. 10B, an FC value of 0 (e.g., '00') may be reserved for another purpose without being used (1010).

If discovery information is unfragmented (1012), the FC field may be set to 1 (e.g., '01') in a fragment header. In this case, the discovery physical channel information may be set as discovery physical channel information of a discovery physical channel over which the unfragmented discovery information is transmitted.

For a first discovery information fragment (1014), the FC field may be set to 1 (e.g., '01') in a fragment header. In this case, the discovery physical channel information may be set as discovery physical channel information of a discovery physical channel over which the next discovery information fragment is transmitted. In other words, the FC field's value 1 for the unfragmented discovery information may be used even for the first discovery information fragment of the fragmented discovery information.

For a middle (other than the first and last) discovery information fragment (1016), the FC field may be set to 2 (e.g., '10') in a fragment header. In this case, the discovery physical channel information may be set as discovery physical channel information of a discovery physical channel over which the next discovery information fragment is transmitted.

For a last discovery information fragment (1018), the FC field may be set to 3 (e.g., '11') in a fragment header. In this case, the discovery physical channel information may be set as discovery physical channel information of a discovery physical channel over which the last discovery information fragment is transmitted. Alternatively, the discovery physical channel information may be set to values such as 0 which is ignorable (because there is no discovery physical channel of the next fragment to be indicated).

It should be noted herein that the FC values of 0, 1, 2 and 3 are used for the purpose of examples only. Those skilled in the art may use values other than the exampled ones.

Figure 11A:
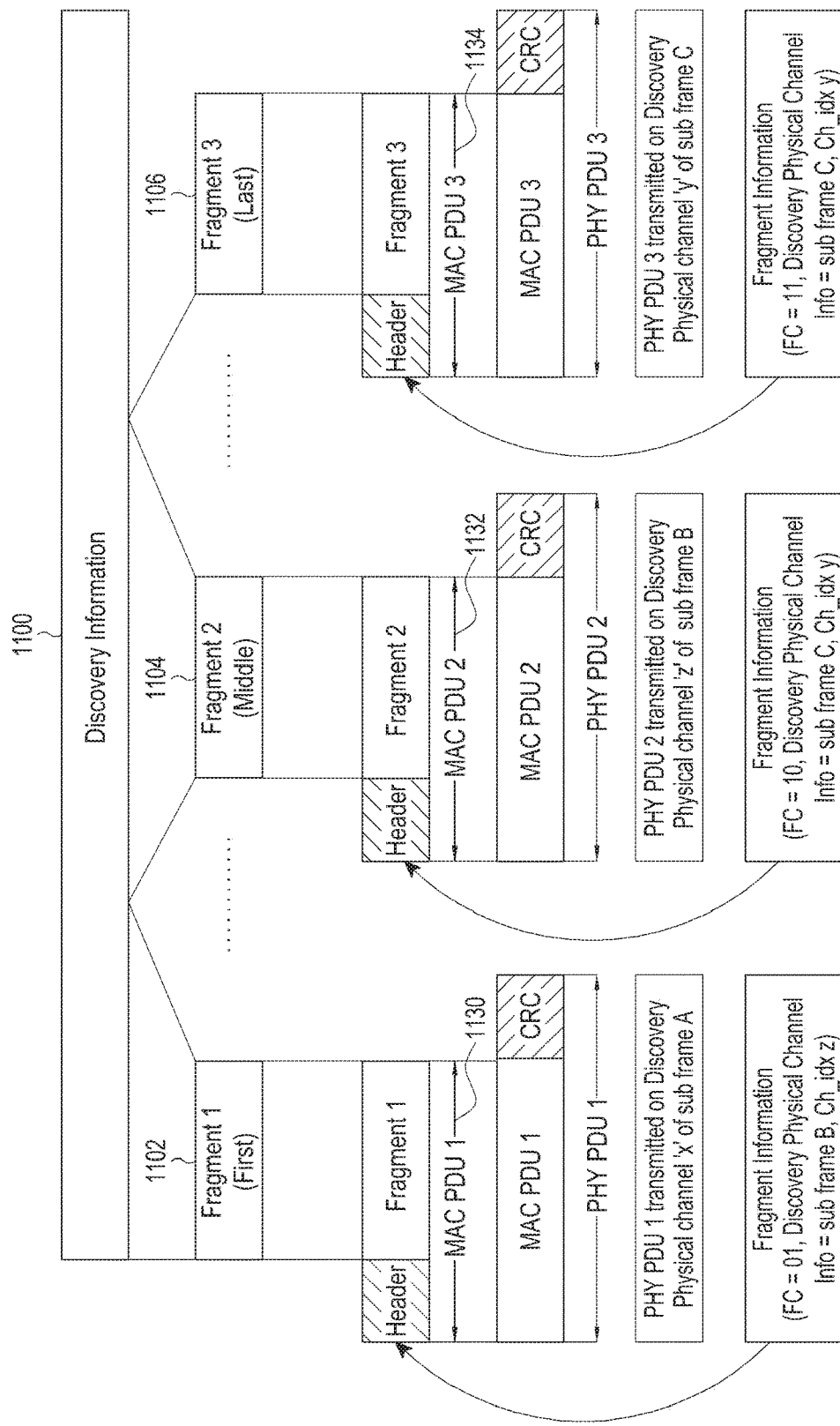
FIGS. 11A and 11B illustrate a method of transmitting discovery information fragments in multiple subframes using encoding of the forward chaining scheme in the first method of the present disclosure.
Figure 11B:
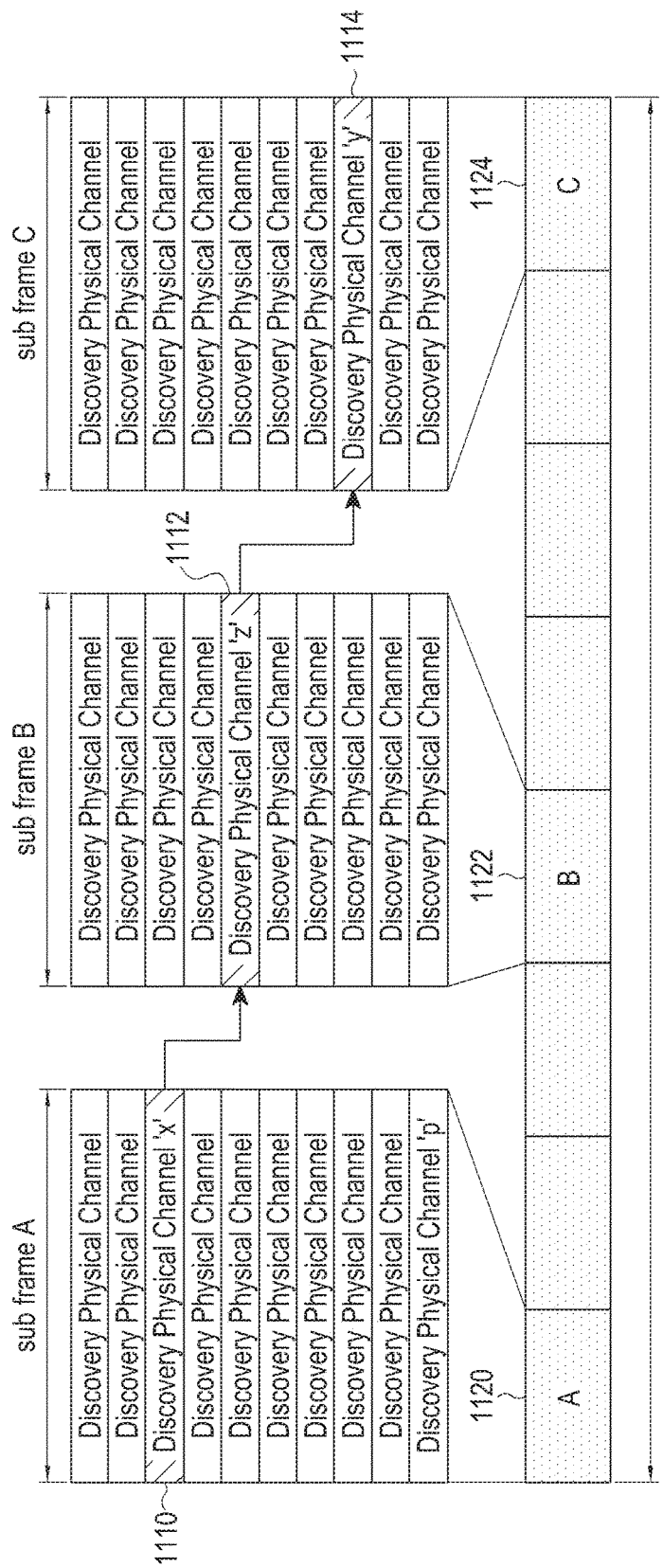

FIGS. 11A and 11B illustrate a method of transmitting discovery information fragments in multiple subframes using encoding of the forward chaining scheme in the first method of the present disclosure.

FIG. 11A illustrates a method of fragmenting and transmitting discovery information using fragmentation information encoding when discovery information 1100 is fragmented into three fragments 1102, 1104 and 1106.

The three discovery information fragments 1102, 1104 and 1106 may be transmitted over discovery physical channels 1110, 1112 and 1114 having discovery physical channel indexes x, z and y, respectively (as illustrated in FIG. 11B). The discovery physical channels 1110, 1112 and 1114 may be transmitted in different subframes A 1120, B 1122 and C 1124, respectively (as illustrated in FIG. 11B).

In a MAC PDU 1130 carrying the first discovery information fragment 1102, FC may be set to 1 (e.g., '01') and the discovery physical channel information may be set as <subframe B, Ch_idx 'z'>. In other words, fragmentation information of the MAC PDU 1130 carrying the first discovery information fragment 1102 may be set to include discovery physical channel information of the second discovery information fragment 1104, and the discovery physical channel information may include a subframe number and a channel index.

In a MAC PDU 1132 carrying the second discovery information fragment 1104, FC may be set to 2 (e.g., '10') and the discovery physical channel information may be set as <subframe C, Ch_idx 'y'>. In other words, fragmentation information of the MAC PDU 1132 carrying the second discovery information fragment 1104 may be set to include discovery physical channel information of the third discovery information fragment 1106, and the discovery physical channel information may include a subframe number and a channel index.

In a MAC PDU 1134 carrying the third (or last) discovery information fragment 1106, FC may be set to 3 (e.g., '11') and the discovery physical channel information may be set as <subframe C, Ch_idx 'y'>. In other words, fragmentation information of the MAC PDU 1134 carrying the third discovery information fragment 1106 may be set to include discovery physical channel information of the third discovery information fragment 1106, and the discovery physical channel information may include a subframe number and a channel index.

FIG. 11B illustrates an example in which discovery information fragments are sequentially chained to each other using FC and discovery physical channel information fields.

By using fragmentation information included in a header of a discovery information fragment, a Rx UE may know the presence/absence of the next discovery information fragment, a unique number of a subframe in which the next discovery information fragment (if any) is transmitted, and an index of a discovery physical channel.

In this way, the FC and discovery physical channel information fields may enable the Rx UE to easily reassemble discovery information fragments into discovery information.

FIGS. 12A and 12B illustrate fragmentation information encoded for two fragments by the forward chaining scheme in the first method of the present disclosure.

Referring to FIGS. 12A and 12B, encoding methods in FIGS. 12A and 12B are improvements of the encoding methods illustrated in FIGS. 6A and 6B and FIGS. 10A and 10B for the case where the number of fragments is two (2), respectively.

If discovery information is fragmented into a maximum of two fragments, an Rx UE may determine whether the discovery information is fragmented and the positions of the fragments, based on the discovery physical channel information, so FC bits may not be included in the fragment header.

In the encoding method of FIG. 12A, only the discovery physical channel index may be used as discovery physical channel information.

If discovery information is unfragmented (1200), the discovery physical channel index Ch_idx may be set to FFFF or any predefined value in a fragment header.

In a fragment header of a first discovery information fragment (1202) in the case where the discovery information is fragmented, the Ch_idx may be set as a discovery physical channel index of a second discovery information fragment.

In a fragment header of the second discovery information fragment (1204) in the case where the discovery information is fragmented, the Ch_idx may be set as a discovery physical channel index of the second discovery information fragment.

In the encoding method of FIG. 12B, a subframe number and a discovery physical channel index Ch_idx may be used as discovery physical channel information. A case where the discovery physical channel information includes a subframe number may correspond to a case where multiple discovery physical channels transmitting discovery information fragments are transmitted in different discovery transmission time intervals (e.g., subframes).

If discovery information is unfragmented (1210), the discovery physical channel information may be set to FFFF or any predefined value in a fragment header.

In a fragment header of a first discovery information fragment (1212) in the case where the discovery information is fragmented, the discovery physical channel information may be set as discovery physical channel information of a second discovery information fragment.

In a fragment header of the second discovery information fragment (1214) in the case where the discovery information is fragmented, the discovery physical channel information may be set as discovery physical channel information of the second discovery information fragment.

FIGS. 13A to 13C illustrate examples of modifications of fragmentation information encoded by a reverse chaining scheme in the first method of the present disclosure.

Referring to FIGS. 13A to 13C, fragmentation information including FC bits and a discovery physical channel index Ch_idx may be encoded along with a discovery information fragment in a discovery information fragment header. It is assumed herein that all fragments of discovery information are transmitted in the same discovery transmission time interval (e.g., the same subframe).

In the encoding method of FIG. 13A, if discovery information is unfragmented (1300), an FC field may be set to 0 (e.g., '00') in a fragment header. In this case, the Ch_idx may be set as a discovery physical channel index of a discovery physical channel over which the unfragmented discovery information is transmitted. Alternatively, the Ch_idx may be set to values such as 0 which is ignorable.

For a first discovery information fragment (1302), the FC field may be set to 1 (e.g., '01') in a fragment header. In this case, the Ch_idx may be set as a discovery physical channel index of a discovery physical channel over which the first discovery information fragment is transmitted.

For a middle (other than the first and last) discovery information fragment (1304), the FC field may be set to 2 (e.g., '10') in a fragment header. In this case, the Ch_idx may be set as a discovery physical channel index of a discovery physical channel over which the previous discovery information fragment is transmitted.

For a last discovery information fragment (1306), the FC field may be set to 3 (e.g., '11') in a fragment header. In this case, the Ch_idx may be set as a discovery physical channel index of a discovery physical channel over which the previous discovery information fragment is transmitted.

It should be noted herein that the FC values of 0, 1, 2 and 3 are used for the purpose of examples only. Those skilled in the art may use values other than the exampled ones.

In the encoding method of FIG. 13B, an FC value of 0 (e.g., '00') may be reserved for another purpose without being used (1310).

If discovery information is unfragmented (1318), the FC field may be set to 3 (e.g., '11') in a fragment header. In this case, the Ch_idx may be set as a discovery physical channel index of a discovery physical channel over which the unfragmented discovery information is transmitted.

For a first discovery information fragment (1312), the FC field may be set to 1 (e.g., '01') in a fragment header. In this case, the Ch_idx may be set as a discovery physical channel index of a discovery physical channel over which the first discovery information fragment is transmitted.

For a middle (other than the first and last) discovery information fragment (1314), the FC field may be set to 2 (e.g., '10') in a fragment header. In this case, the Ch_idx may be set as a discovery physical channel index of a discovery physical channel over which the previous discovery information fragment is transmitted.

For a last discovery information fragment (1316), the FC field may be set to 3 (e.g., '11') in a fragment header. In this case, the Ch_idx may be set as a discovery physical channel index of a discovery physical channel over which the previous discovery information fragment is transmitted.

It should be noted herein that the FC values of 0, 1, 2 and 3 are used for the purpose of examples only. Those skilled in the art may use values other than the exampled ones.

In the encoding method of FIG. 13C, an FC value of 3 (e.g., '11') may be reserved for another purpose without being used (1328).

If discovery information is unfragmented (1320), the FC field may be set to 0 (e.g., '00') in a fragment header. In this case, the Ch_idx may be set as a discovery physical channel index of a discovery physical channel over which the unfragmented discovery information is transmitted. Alternatively, the Ch_idx may be set to values such as 0 which is ignorable.

For a first discovery information fragment (1322), the FC field may be set to 1 (e.g., '01') in a fragment header. In this case, the Ch_idx may be set as a discovery physical channel index of a discovery physical channel over which the first discovery information fragment is transmitted.

For a middle (other than the first and last) discovery information fragment (1324), the FC field may be set to 2 (e.g., '10') in a fragment header. In this case, the Ch_idx may be set as a discovery physical channel index of a discovery physical channel over which the previous discovery information fragment is transmitted.

For a last discovery information fragment (1326), the FC field may be set to 2 (e.g., '10') in a fragment header. In this case, the Ch_idx may be set as a discovery physical channel index of a discovery physical channel over which the previous discovery information fragment is transmitted.

It should be noted herein that the FC values of 0, 1, 2 and 3 are used for the purpose of examples only. Those skilled in the art may use values other than the exampled ones.

Figure 14A:
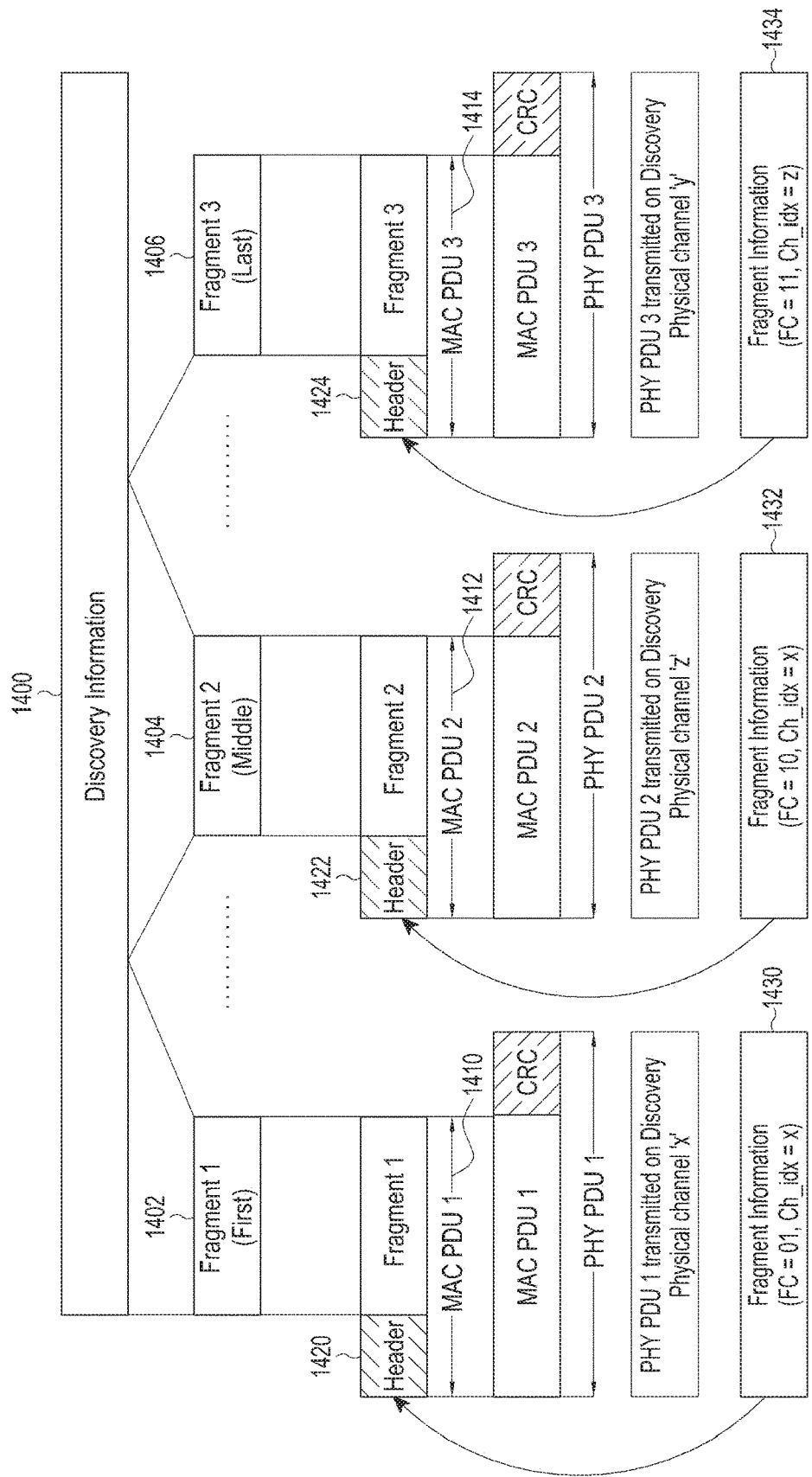
FIGS. 14A to 14C illustrate a method of fragmenting discovery information using encoding of the reverse chaining scheme in the first method of the present disclosure.
Figure 14B:
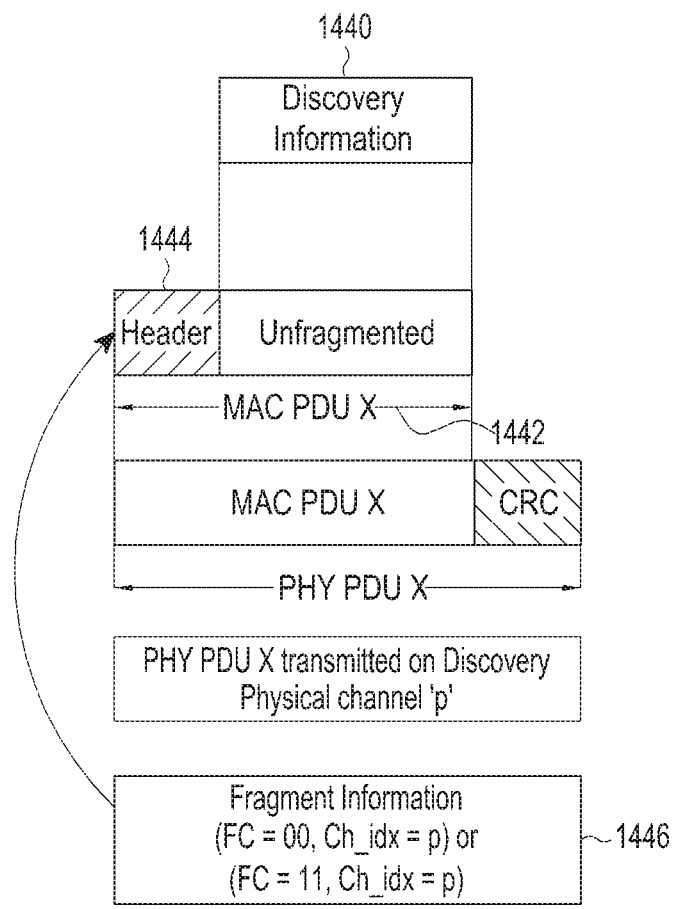
Figure 14C:
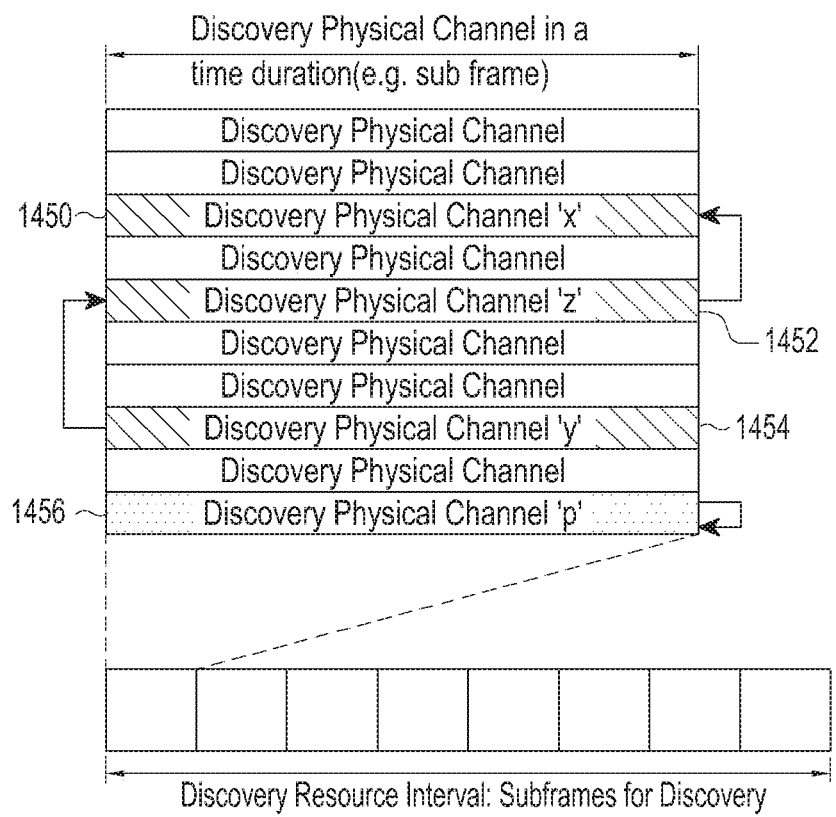

FIGS. 14A to 14C illustrate a method of fragmenting discovery information using encoding of the reverse chaining scheme in the first method of the present disclosure.

FIG. 14A illustrates an example in which discovery information 1400 is fragmented into three fragments 1402, 1404 and 1406.

The three fragmented discovery information fragments 1402, 1404 and 1406 may be transmitted over discovery physical channels 1450, 1452 and 1454 having channel indexes x, z and y, respectively.

A header 1420 of a MAC PDU 1410 carrying the first discovery information fragment 1402 may include fragmentation information 1430. FC and Ch_idx, which may be included in the fragmentation information 1430, are set to 1 (e.g., '01') and 'x', respectively. In other words, the Ch_idx may be set as an index of a discovery physical channel transmitting the first discovery information fragment 1402.

A header 1422 of a MAC PDU 1412 carrying the second discovery information fragment 1404 may include fragmentation information 1432. FC and Ch_idx, which may be included in the fragmentation information 1432, are set to 2 (e.g., '10') and 'x', respectively. In other words, the Ch_idx may be set as an index of a discovery physical channel transmitting the first discovery information fragment 1402.

A header 1424 of a MAC PDU 1414 carrying the third (or last) discovery information fragment 1406 may include fragmentation information 1434. FC and Ch_idx, which may be included in the fragmentation information 1434, are set to 3 (e.g., '11') and 'z', respectively. In other words, the Ch_idx may be set as an index of a discovery physical channel transmitting the second discovery information fragment 1404.

FIG. 14B illustrates fragmentation information encoded when discovery information is unfragmented.

Unfragmented discovery information 1440 may be transmitted over a discovery physical channel 1456 with a channel index 'p'. A header 1444 of a MAC PDU 1442 carrying the unfragmented discovery information 1440 may include fragmentation information 1446. FC and Ch_idx, which may be included in the fragmentation information 1446, are set to 0 (e.g., '00') or 3 (e.g., '11') and to 'p', respectively. In other words, the Ch_idx may be set as an index of a discovery physical channel transmitting the unfragmented discovery information 1440.

FIG. 14C illustrates the structure in which a fragmented discovery information fragment or an unfragmented discovery information fragment is transmitted over one or more discovery physical channels.

It can be seen from FIG. 14C that the discovery information fragments are sequentially reverse-chained to each other using the FC and Ch_idx fields.

By using the FC and Ch_idx fields, an Rx UE may identify discovery physical channels over which fragmented discovery information fragments are transmitted, and may sequentially reassemble the discovery information fragments which are transmitted over the discovery physical channels. For example, upon reading the fragmentation information 1434 included in the header 1424 of the discovery information fragment 1406 that is transmitted in the discovery physical channel 1454 carrying the third discovery information fragment 1406, the Rx UE may know the presence/absence of the previous discovery information fragment and the information (e.g., Ch_idx=z) of the discovery physical channel 1452 over which the previous discovery information fragment is transmitted. Therefore, the Rx UE may obtain the previous discovery information fragment 1404 from the discovery physical channel 1452 with an index 'z'. Similarly, based on the fragmentation information 1432 included in the header 1422 of the previous discovery information fragment 1404, the Rx UE may know the presence/absence of the first discovery information fragment 1402 and the information (e.g., Ch_idx=x) of the discovery physical channel 1450 over which the first discovery information fragment 1402 is transmitted.

In this way, using the encoded fragmentation information, the Rx UE may easily reassemble the discovery information fragments into discovery information.

Figures 15A, 15B, 15C:
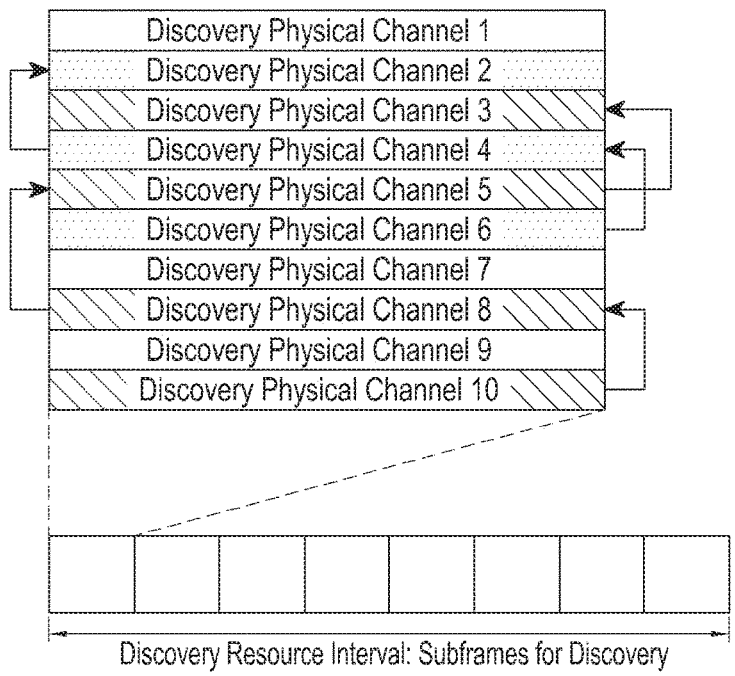
FIGS. 15A to 15C illustrate various methods of fragmenting discovery information using encoding of the reverse chaining scheme in the first method of the present disclosure.

FIGS. 15A to 15C illustrate various methods of fragmenting discovery information using encoding of the reverse chaining scheme in the first method of the present disclosure.

FIG. 15A illustrates fragmentation information encoded when discovery information 1 is fragmented into four fragments. The discovery information 1 may be fragmented into four fragments, which are transmitted using discovery physical channels 3, 5, 8 and 10.

FIG. 15B illustrates fragmentation information encoded when discovery information 2 is fragmented into three fragments. The discovery information 2 may be fragmented into three fragments, which are transmitted using discovery physical channels 2, 4 and 6.

Referring to FIGS. 15A and 15B, the discovery information 1 may be transmitted by a Tx UE1, and the discovery information 2 may be transmitted by a Tx UE2.

FIG. 15C illustrates a connection (or chain) relationship by the reverse chaining scheme between discovery physical channels when fragmented discovery information fragments are transmitted over multiple discovery physical channels.

Referring to FIG. 15C, the proposed encoding of fragmentation information may chain the fragments of the discovery information 1 and the discovery information 2 to each other. In other words, the fragmentation information encoded in discovery information fragments may enable an Rx UE to correctly reassemble the fragments into the discovery information.

FIGS. 16A to 16C illustrate fragmentation information that includes a subframe number during encoding of the reverse chaining scheme in the first method of the present disclosure.

Referring to FIGS. 16A to 16C, in this embodiment, fragmentation information may be encoded along with a discovery information fragment in a discovery information fragment header, and the fragmentation information may include FC bits and discovery physical channel information.

It will be assumed in this embodiment that the fragments of the fragmented discovery information are transmitted in the same or different discovery transmission time intervals. In other words, discovery physical channels used for transmission of the discovery information fragments may be transmitted in different subframes. Therefore, in this embodiment, the discovery physical channel information may include a subframe number and a channel index Ch_idx.

In the encoding method of FIG. 16A, if discovery information is unfragmented (1600), an FC field may be set to 0 (e.g., '00') in a fragment header. In this case, the discovery physical channel information may be set as discovery physical channel information of a discovery physical channel over which the unfragmented discovery information is transmitted. Alternatively, if the discovery information is unfragmented, the discovery physical channel information may be set to values (such as, for example, zero (0)) which are ignorable.

For a first discovery information fragment (1602), the FC field may be set to 1 (e.g., '01') in a fragment header. In this case, the discovery physical channel information may be set as discovery physical channel information of a discovery physical channel over which the first discovery information fragment is transmitted.

For a middle (other than the first and last) discovery information fragment (1604), the FC field may be set to 2 (e.g., '10') in a fragment header. In this case, the discovery physical channel information may be set as discovery physical channel information of a discovery physical channel over which the previous discovery information fragment is transmitted.

For a last discovery information fragment (1606), the FC field may be set to 3 (e.g., '11') in a fragment header. In this case, the discovery physical channel information may be set as discovery physical channel information of a discovery physical channel over which the previous discovery information fragment is transmitted.

It should be noted herein that the FC values of 0, 1, 2 and 3 are used for the purpose of examples only. Those skilled in the art may use values other than the exampled ones.

In the encoding method of FIG. 16B, an FC value of 0 (e.g., '00') may be reserved for another purpose without being used (1610).

If discovery information is unfragmented (1618), the FC field may be set to 3 (e.g., '11') in a fragment header. In this case, the discovery physical channel information may be set as discovery physical channel information of a discovery physical channel over which the unfragmented discovery information fragment is transmitted.

For a first discovery information fragment (1612), the FC field may be set to 1 (e.g., '01') in a fragment header. In this case, the discovery physical channel information may be set as discovery physical channel information of a discovery physical channel over which the first discovery information fragment is transmitted.

For a middle (other than the first and last) discovery information fragment (1614), the FC field may be set to 2 (e.g., '10') in a fragment header. In this case, the discovery physical channel information may be set as discovery physical channel information of a discovery physical channel over which the previous discovery information fragment is transmitted.

For a last discovery information fragment (1616), the FC field may be set to 3 (e.g., '11') in a fragment header. In this case, the discovery physical channel information may be set as discovery physical channel information of a discovery physical channel over which the previous discovery information fragment is transmitted.

It should be noted herein that the FC values of 0, 1, 2 and 3 are used for the purpose of examples only. Those skilled in the art may use values other than the exampled ones.

In the encoding method of FIG. 16C, an FC value of 3 (e.g., '11') may be reserved for another purpose without being used (1628).

If discovery information is unfragmented (1620), the FC field may be set to 0 (e.g., '00') in a fragment header. In this case, the discovery physical channel information may be set as discovery physical channel information of a discovery physical channel over which the unfragmented discovery information fragment is transmitted. Alternatively, the discovery physical channel information may be set to values such as 0 which is ignorable.

For a first discovery information fragment (1622), the FC field may be set to 1 (e.g., '01') in a fragment header. In this case, the discovery physical channel information may be set as discovery physical channel information of a discovery physical channel over which the first discovery information fragment is transmitted.

For a middle (other than the first and last) discovery information fragment (1624), the FC field may be set to 2 (e.g., '10') in a fragment header. In this case, the discovery physical channel information may be set as discovery physical channel information of a discovery physical channel over which the previous discovery information fragment is transmitted.

For a last discovery information fragment (1626), the FC field may be set to 2 (e.g., '10') in a fragment header. In this case, the discovery physical channel information may be set as discovery physical channel information of a discovery physical channel over which the previous discovery information fragment is transmitted.

It should be noted herein that the FC values of 0, 1, 2 and 3 are used for the purpose of examples only. Those skilled in the art may use values other than the exampled ones.

Figure 17A:
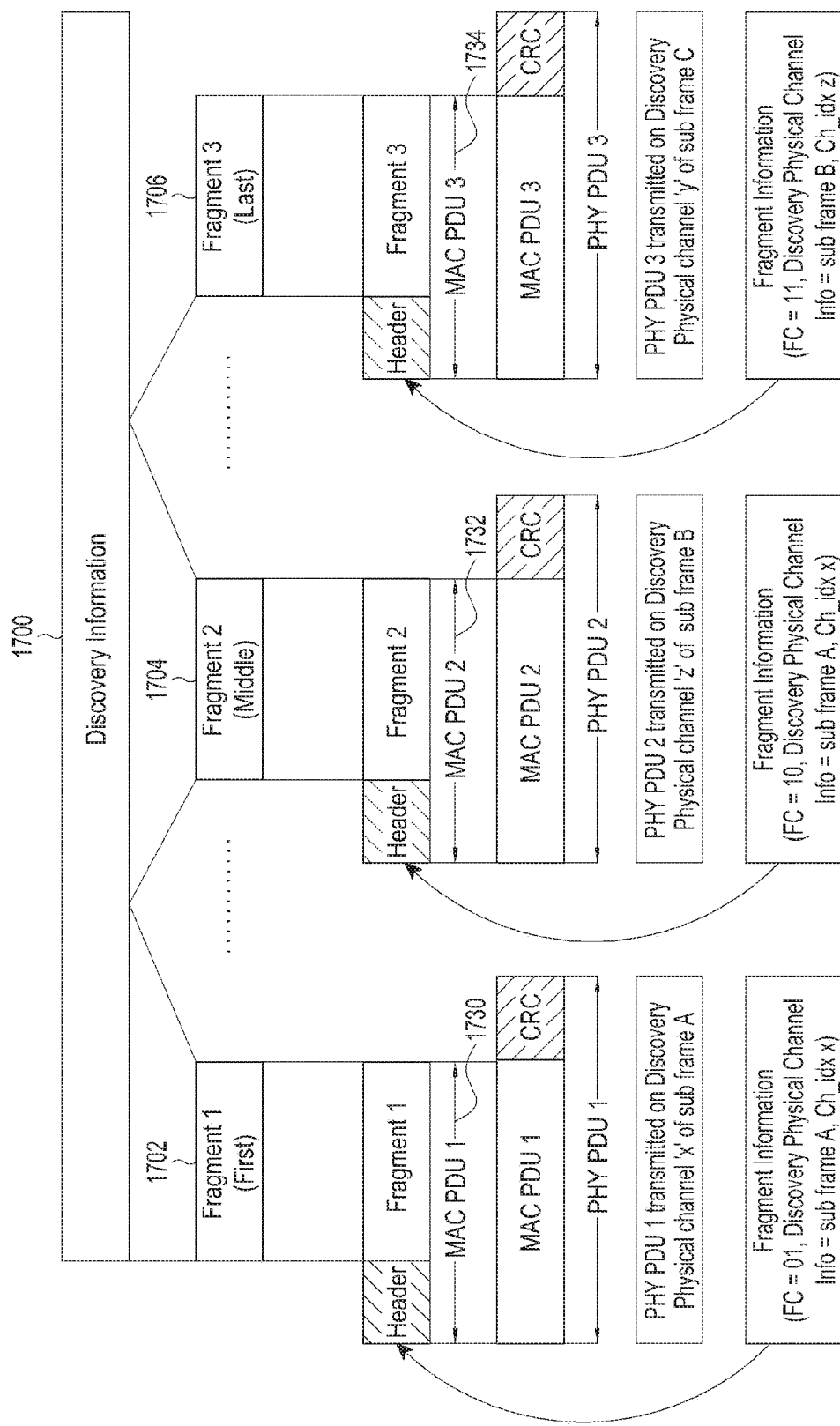
FIGS. 17A and 17B illustrate a method of transmitting discovery information fragments in multiple subframes using encoding of the reverse chaining scheme and the resource structure thereof, in the first method of the present disclosure.
Figure 17B:
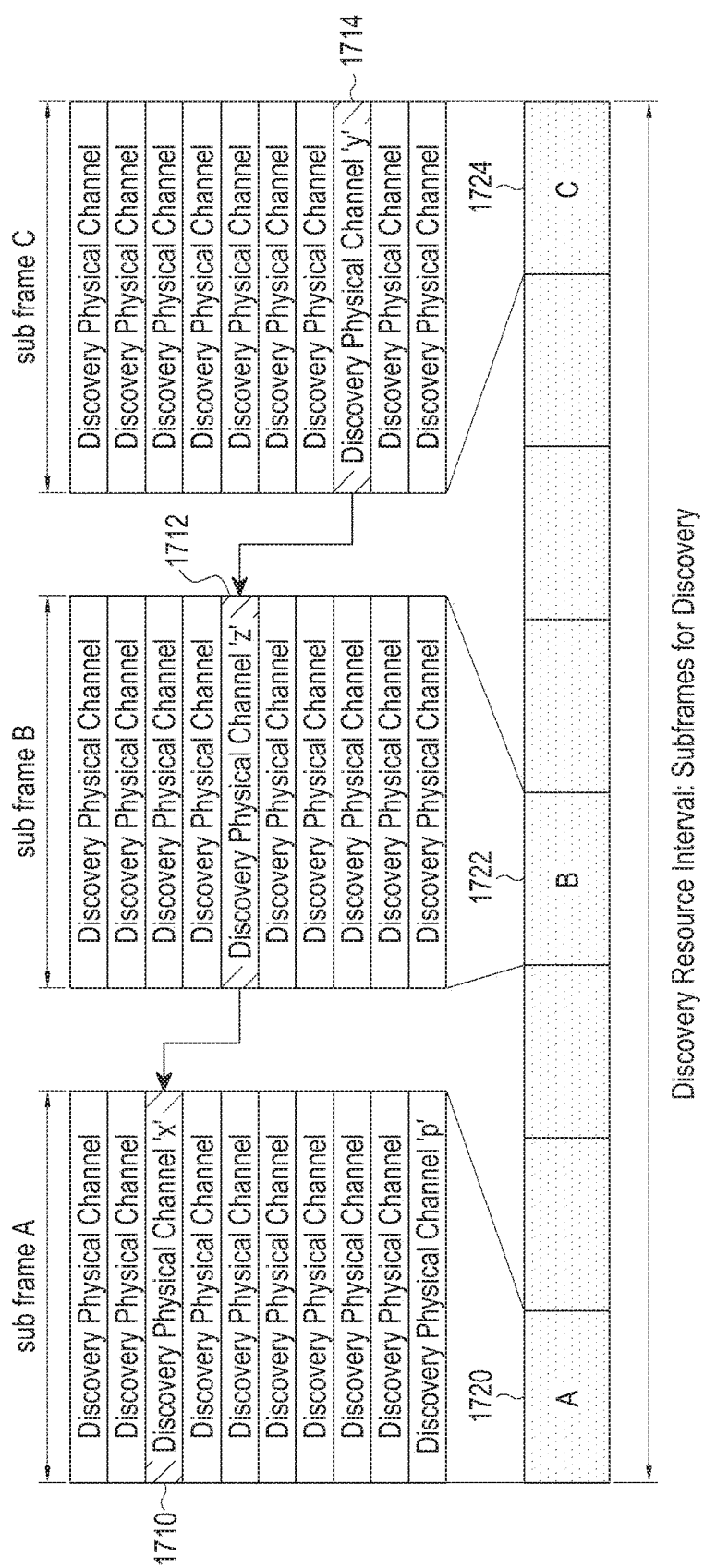

FIGS. 17A and 17B illustrate a method of transmitting discovery information fragments in multiple subframes using encoding of the reverse chaining scheme and the resource structure thereof, in the first method of the present disclosure according to an embodiment.

FIG. 17A illustrates a method of fragmenting and transmitting discovery information using fragmentation information encoding when discovery information 1700 is fragmented into three fragments 1702, 1704 and 1706.

The three discovery information fragments 1702, 1704 and 1706 may be transmitted over discovery physical channels 1710, 1712 and 1714 having discovery physical channel indexes x, z and y, respectively. The discovery physical channels 1710, 1712 and 1714 may be transmitted in different subframes A 1720, B 1722 and C 1724, respectively.

In a MAC PDU 1730 carrying the first discovery information fragment 1702, FC may be set to 1 (e.g., '01') and the discovery physical channel information may be set as <subframe A, Ch_idx 'x'>. In other words, the discovery physical channel information may be set as information about a discovery physical channel over which the first discovery information fragment 1702 is transmitted.

In a MAC PDU 1732 carrying the second discovery information fragment 1704, FC may be set to 2 (e.g., '10') and the discovery physical channel information may be set as <subframe A, Ch_idx 'x'>. In other words, the discovery physical channel information may be set as information about a discovery physical channel over which the first discovery information fragment 1702 is transmitted.

In a MAC PDU 1734 carrying the third (or last) discovery information fragment 1706, FC may be set to 3 (e.g., '11') and the discovery physical channel information may be set as <subframe B, Ch_idx 'z'>. In other words, the discovery physical channel information may be set as information about a discovery physical channel over which the second discovery information fragment 1704 is transmitted.

FIG. 17B illustrates an example in which discovery information fragments are sequentially chained to each other using FC and discovery physical channel information fields.

By using fragmentation information included in a header of a discovery information fragment, a Rx UE may know the presence/absence of the previous discovery information fragment, a unique number of a subframe in which the next discovery information fragment (if any) is transmitted, and an index of a discovery physical channel.

It can be seen from FIG. 17B that the discovery information fragments are sequentially reverse-chained to each other using the FC and discovery physical channel information fields. The FC and discovery physical channel information fields may enable the Rx UE to easily reassemble discovery information fragments into discovery information.

FIGS. 18A and 18B illustrate fragmentation information encoded for two fragments by the reverse chaining scheme in the first method of the present disclosure.

Encoding methods in FIGS. 18A and 18B are improvements of the encoding methods illustrated in FIGS. 13A to 13C and FIGS. 16A to 16C for the case where the number of fragments is two (2), respectively.

If discovery information is fragmented into a maximum of two fragments, an Rx UE may determine whether the discovery information is fragmented and the positions of the fragments, based on the discovery physical channel information, so FC bits may not be included in the fragment header.

In the encoding method of FIG. 18A, only the discovery physical channel index may be used as discovery physical channel information.

If discovery information is unfragmented (1800), the discovery physical channel index Ch_idx may be set to FFFF or any predefined value in a fragment header.

In a fragment header of a first discovery information fragment (1802) in the case where the discovery information is fragmented, the Ch_idx may be set as a discovery physical channel index of the first discovery information fragment.

In a fragment header of a second discovery information fragment (1804) in the case where the discovery information is fragmented, the Ch_idx may be set as a discovery physical channel index of the first discovery information fragment.

In the encoding method of FIG. 18B, a subframe number and a discovery physical channel index Ch_idx may be used as discovery physical channel information. A case where the discovery physical channel information includes a subframe number may correspond to a case where multiple discovery physical channels transmitting discovery information fragments are transmitted in different discovery transmission time intervals (e.g., subframes).

If discovery information is unfragmented (1810), the discovery physical channel information may be set to FFFF or any predefined value in a fragment header.

In a fragment header of a first discovery information fragment (1812) in the case where the discovery information is fragmented, the discovery physical channel information may be set as discovery physical channel information of the first discovery information fragment.

In a fragment header of a second discovery information fragment (1814) in the case where the discovery information is fragmented, the discovery physical channel information may be set as discovery physical channel information of the first discovery information fragment.

Second, the second method of supporting reassembling by an Rx UE for the information fragments transmitted by a Tx UE will be described. The second method is a method of encoding at least one of a Tx UE's identifier (e.g., TX-UE-ID), an SN of a fragment, and FC information in each fragment as fragmentation information.

Figure 19A:
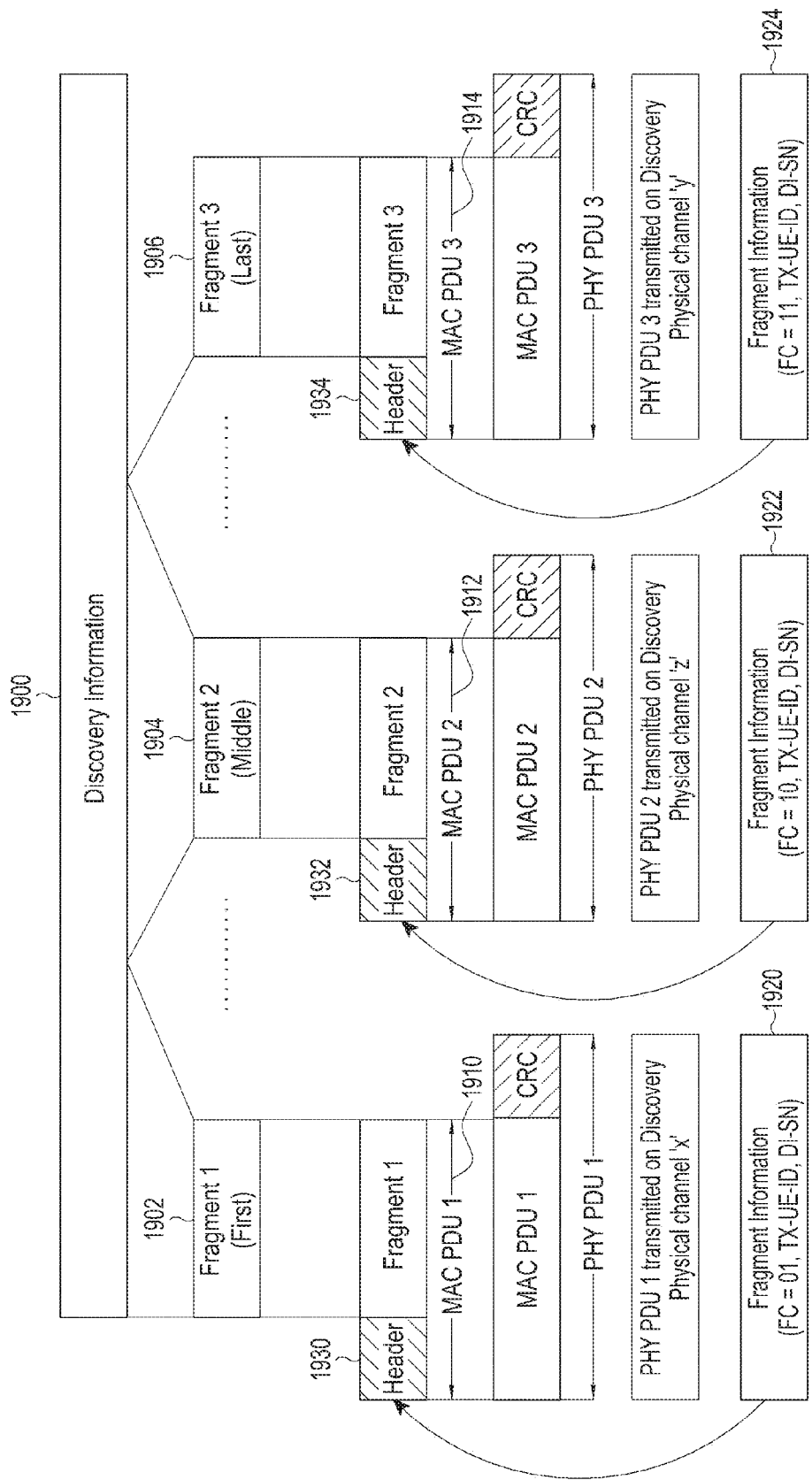
FIGS. 19A to 19C illustrate a method of fragmenting discovery information in a second method of the present disclosure.
Figure 19B:
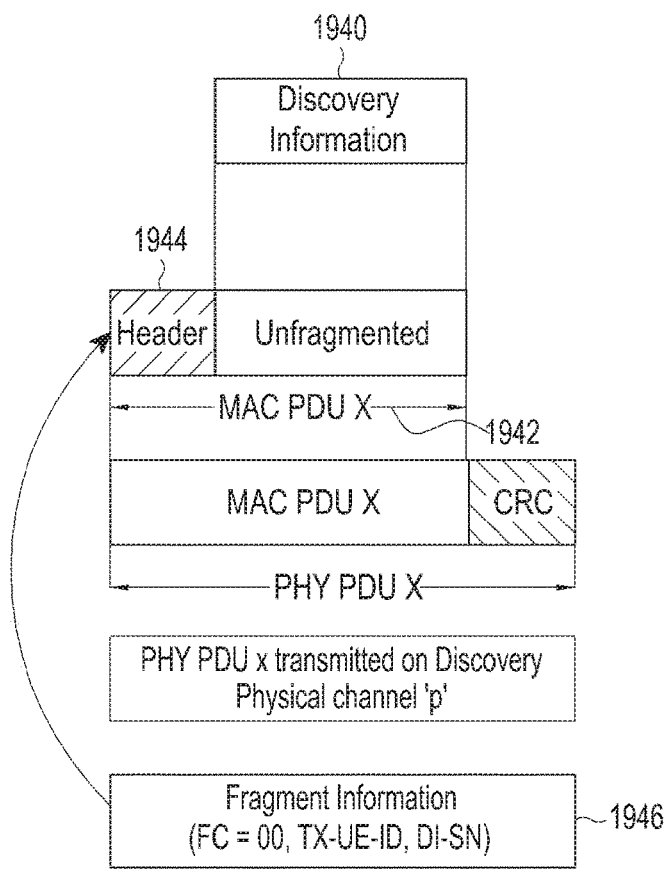
Figure 19C:
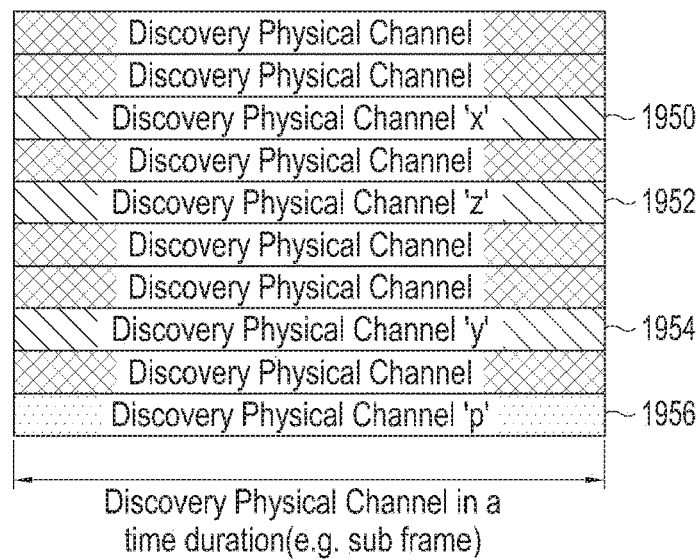

FIGS. 19A to 19C illustrate a method of fragmenting discovery information in a second method of the present disclosure.

Referring to FIGS. 19A to 19C, in the second method, an SN and a TX-UE-ID may be used in place of discovery physical channel information of fragmentation information. In other words, a header of each discovery information fragment may include a TX-UE-ID in fragmentation information.

The SN may be uniquely assigned to each discovery information fragment. The SN may also be uniquely assigned to multiple discovery information fragments for a predetermined time. The SN may be reset (or initialized) after a lapse of the predetermined time. In an embodiment, the predetermined time may be one discovery resource cycle. In an embodiment, the SN may also be assigned to unfragmented discovery information. As for the SN, its unique value may be assigned to all of the fragmented discovery information fragments and the unfragmented discovery information.

FIG. 19A illustrates fragmentation information encoded in fragments when discovery information 1900 is fragmented into three fragments 1902, 1904 and 1906.

The three fragments 1902, 1904 and 1906 may be transmitted over discovery physical channels 1950, 1952 and 1954 having channel indexes x, z and y, respectively.

A header 1930 of a MAC PDU 1910 carrying the first discovery information fragment 1902 may include fragmentation information 1920. FC, which may be included in the fragmentation information 1920, is set to 1 (e.g., '01'). The fragmentation information 1920 may further include a TX-UE-ID and a discovery information-SN (DI-SN).

A header 1932 of a MAC PDU 1912 carrying the second discovery information fragment 1904 may include fragmentation information 1922. FC, which may be included in the fragmentation information 1922, is set to 2 (e.g., '10'). The fragmentation information 1922 may further include a TX-UE-ID and a DI-SN.

A header 1934 of a MAC PDU 1914 carrying the third discovery information fragment 1906 (e.g., the last discovery information fragment) may include fragmentation information 1924. FC, which may be included in the fragmentation information 1924, is set to 3 (e.g., '11'). The fragmentation information 1924 may further include a TX-UE-ID and a DI-SN.

FIG. 19B illustrates fragmentation information encoded when discovery information is unfragmented.

Unfragmented discovery information 1940 may be transmitted over a discovery physical channel 1956 with a channel index 'p'. A header 1944 of a MAC PDU 1942 carrying the unfragmented discovery information 1940 may include fragmentation information 1946. FC, which may be included in the fragmentation information 1946, may be set to 0 (e.g., '00') or 1 (e.g., '01'). The fragmentation information 1946 may further include a TX-UE-ID and a DI-SN.

FIG. 19C illustrates the structure in which a fragmented discovery information fragment or an unfragmented discovery information fragment is transmitted over one or more discovery physical channels.

Referring to FIG. 19C, discovery information fragments may be sequentially chained to each other using the TX-UE-ID and DI-SN.

An Rx UE, which receives a discovery information fragment, may identify the origin of discovery information fragments which are transmitted over discovery physical channels in a distributed way using the TX-UE-ID, and may identify the sequence among the fragments by using the SN. Therefore, the Rx UE may correctly reassemble the discovery information fragments which are transmitted in a distributed way.

In this way, the Rx UE may easily reassemble discovery information fragments into discovery information, using the encoded fragmentation information.

The methods of using the SN and FC, which have been described above in the present disclosure, may be reused in embodiments to be described in the present disclosure.

Third, the third method of supporting reassembling by an Rx UE for the information fragments transmitted by a Tx UE will be described. The third method is a method in which the Rx UE uses only the FC information in reassembling of the fragmented information fragments, as the Tx UE transmits information using consecutive transmission resources.

Figure 20A:
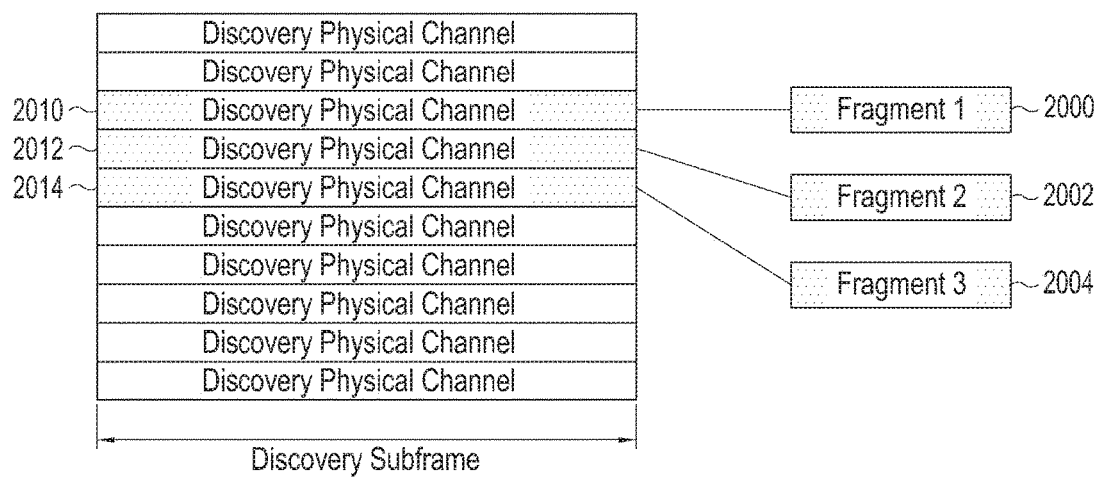
FIGS. 20A and 20B illustrate the resource structure for fragmenting discovery information and transmitting the fragmented discovery information in a third method of the present disclosure.
Figure 20B:
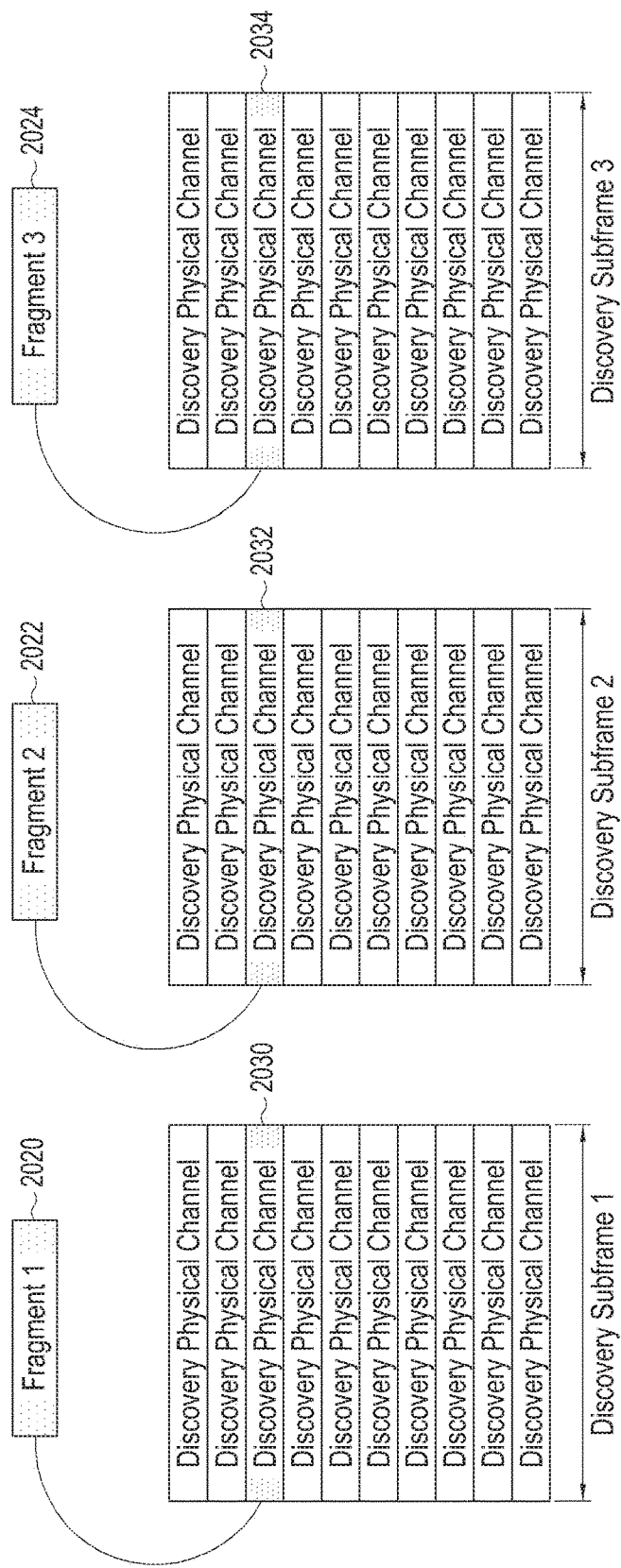

FIGS. 20A and 20B illustrate the resource structure for fragmenting discovery information and transmitting the fragmented discovery information in a third method of the present disclosure.

FIG. 20A illustrates an example of transmitting multiple information fragments through (or over) consecutive resources in one subframe.

Three discovery information fragments 2000, 2002 and 2004 may be transmitted in three resources (e.g., discovery physical channels) 2010, 2012 and 2014, which are present in the same subframe and are consecutive on the frequency axis, respectively. The consecutive three resources may refer to three resources which are adjacent to each other on the frequency axis.

FIG. 20B illustrates an example of transmitting discovery information fragments through resources in the same location in multiple consecutive subframes.

Three discovery information fragments 2020, 2022 and 2024 may be transmitted in three resources (e.g., discovery physical channels) 2030, 2032 and 2034, which are present in the same subframe band (e.g., the same subcarrier) and are consecutive on the time axis, respectively. The consecutive three resources may refer to three resources which are adjacent to each other on the time axis.

Referring to FIGS. 20A and 20B, the only information that should be encoded in a discovery information fragment may be information indicating whether the discovery information fragment is a first fragment, a middle fragment or a last fragment. In this case, the fragmentation information included in a discovery information fragment may be represented only by FC.

The discovery information may be fragmented by any one of the following schemes.

A first fragmentation scheme is a scheme of fragmenting discovery information in a size in which the discovery information can be transmitted over a discovery physical channel. For example, if discovery information includes 100 bytes and one discovery physical channel can transmit 50 bytes, a Tx UE may fragment the discovery information into two fragments each having a size of 50 bytes.

A second fragmentation scheme is a scheme of fragmenting discovery information depending on the information field. For example, if discovery information includes two information fields 'X' and 'Y', a Tx UE may fragment the discovery information into two fragments that transmit the information field 'X' and the information field 'Y', respectively.

Figure 21:
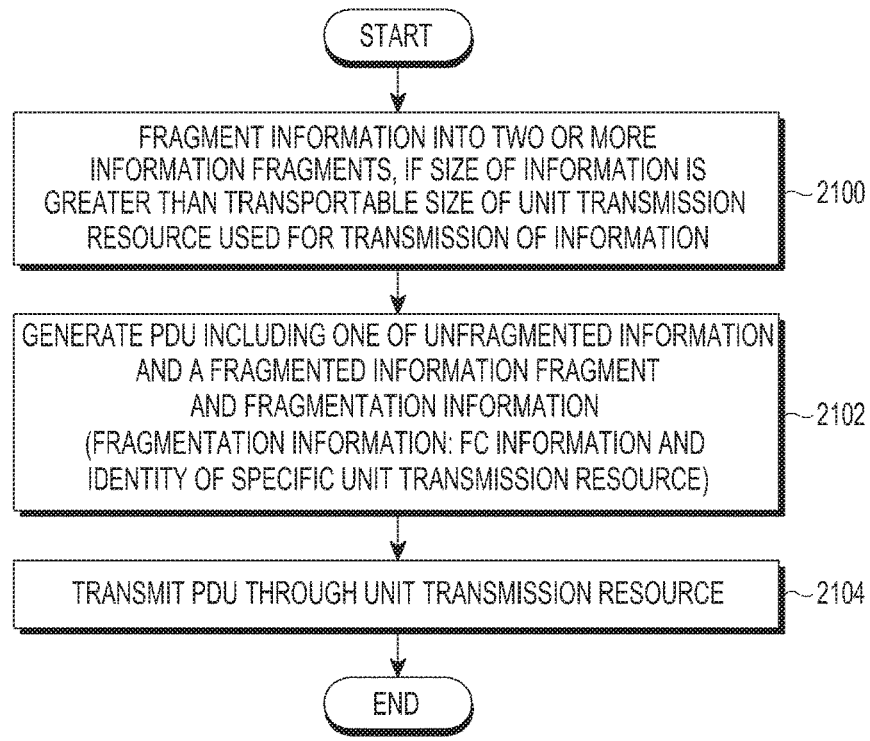
FIG. 21 illustrates a method of transmitting information by a device according to the first method of the present disclosure.

FIG. 21 illustrates a method of transmitting information by a device according to the first method of the present disclosure.

Referring to FIG. 21, in operation 2100, if a size of the information is greater than a transportable size of unit transmission resource used for transmission of the information, the device may fragment the information into two or more information fragments.

In operation 2102, the device may generate a PDU including one of unfragmented information and a fragmented information fragment, and fragmentation information.

In operation 2104, the device may transmit the PDU through the unit transmission resource.

The fragmentation information may include FC information indicating at least one of whether the information is fragmented or not, and a position of the fragmented information fragment included in the PDU within the two or more information fragments. The fragmentation information may further include an identity of specific unit transmission resource within the at least one transmission time interval. The fragmentation information may be included in a header of the PDU. The fragmentation information may further include an identifier of the device.

The identity of the specific unit transmission resource may be uniquely assigned. Thus, the identity of the specific unit transmission resource may be distinguished from all other unit transmission resources within the transmission time interval.

The information may be discovery information transmitted by the device, and a unit transmission resource may be, or may include a discovery physical channel.

If the FC information indicates that the information is unfragmented, the identity of specific unit transmission resource may be an identity of unit transmission resource transmitting the unfragmented information, or may have an ignorable value such as zero (0).

In accordance with the forward chaining scheme, if the FC information indicates that a position of an information fragment included in the PDU is a first position or a middle position, the identity of the specific unit transmission resource may be an identity of unit transmission resource transmitting a next information fragment which is positioned next to the information fragment included in the PDU.

In accordance with the reverse chaining scheme, if the FC information indicates that a position of an information fragment included in the PDU is a middle position or a last position, the identity of the specific unit transmission resource may be an identity of unit transmission resource transmitting a previous information fragment which is positioned prior to the information fragment included in the PDU.

The transmission time interval may correspond to a subframe. If the information is transmitted in two or more subframes, the fragmentation information may further include a unique number of a subframe in which the specific unit transmission resource is located.

The PDU may further include a CRC part used for integrity check of one of the unfragmented information and the information fragment. The CRC part may be generated based on a previous information fragment or a next information fragment for the information fragment.

Figure 22:
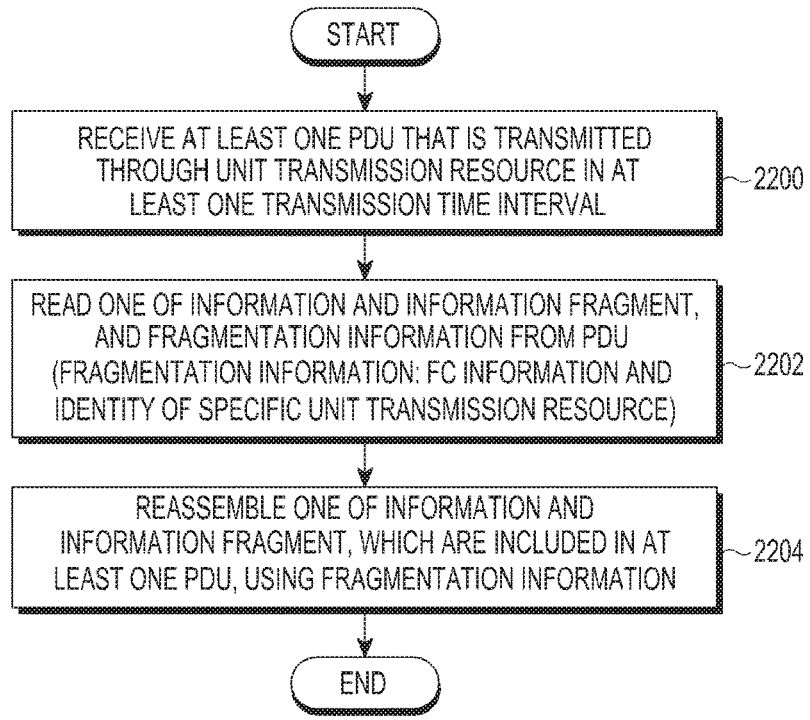
FIG. 22 illustrates a method of receiving information by a device according to the first method of the present disclosure.

FIG. 22 illustrates a method of receiving information by a device according to the first method of the present disclosure.

Referring to FIG. 22, in operation 2200, the device may receive at least one PDU that is transmitted through a unit transmission resource in at least one transmission time interval.

In operation 2202, the device may read one of information and an information fragment, and fragmentation information from the PDU.

In operation 2204, the device may reassemble one of the information and the information fragment, at least one of which is included in the at least one PDU, using the fragmentation information.

If a size of the information is greater than a transportable size of a unit transmission resource, the information may be fragmented into two or more information fragments and transmitted in a transmitting device.

The fragmentation information may include FC information indicating at least one of whether the information is fragmented or not and a position of the information fragment included in the PDU within the two or more information fragments. The fragmentation information may further include an identity of a specific unit transmission resource within the at least one transmission time interval.

The identity of the specific unit transmission resource may be uniquely assigned. Thus, the identity of the specific unit transmission resource may be distinguished from to all other unit transmission resources within the transmission time interval.

The information may be discovery information transmitted by the device, and a unit transmission resource may include a discovery physical channel.

If the FC information indicates that the information is unfragmented, the identity of specific unit transmission resource may be an identity of unit transmission resource transmitting the unfragmented information, or may have an ignorable value such as zero (0).

In accordance with the forward chaining scheme, if the FC information indicates that a position of an information fragment included in the PDU is a first position or a middle position, the identity of the specific unit transmission resources may be an identity of unit transmission resource transmitting a next information fragment which is positioned next to the information fragment included in the PDU.

In accordance with the reverse chaining scheme, if the FC information indicates that a position of an information fragment included in the PDU is a middle position or a last position, the identity of the specific unit transmission resources may be an identity of unit transmission resource transmitting a previous information fragment which is positioned prior to the information fragment included in the PDU.

The transmission time interval may correspond to a subframe. If the information is transmitted in two or more subframes, the fragmentation information may further include a unique number of a subframe in which the specific unit transmission resource is located.

Figure 23:
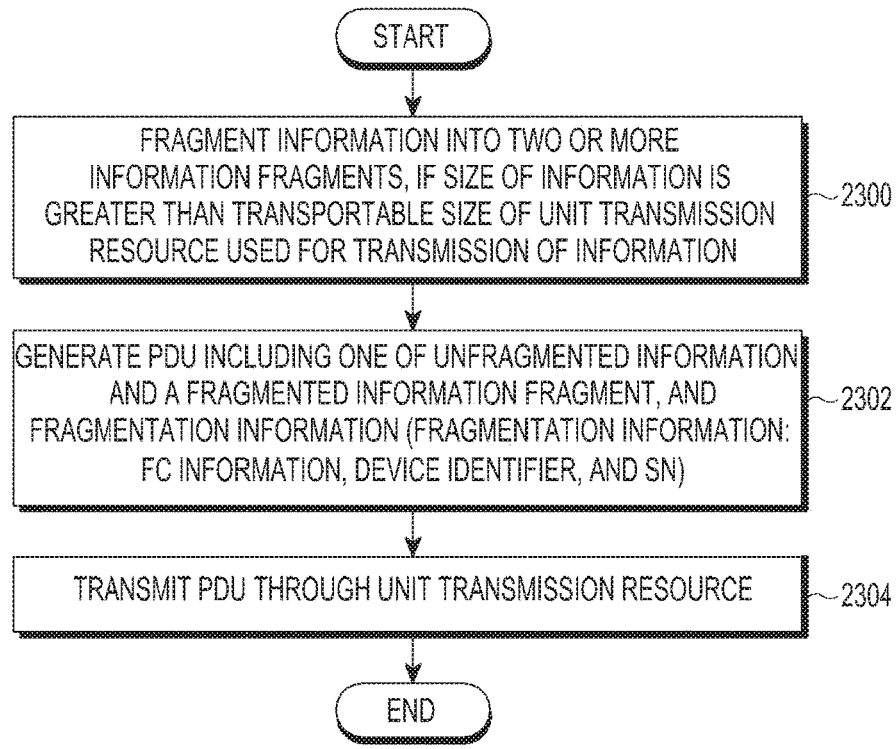
FIG. 23 illustrates a method of transmitting information by a device according to the second method of the present disclosure.

FIG. 23 illustrates a method of transmitting information by a device according to the second method of the present disclosure.

Referring to FIG. 23, in operation 2300, if a size of the information is greater than a transportable size of a unit transmission resource used for transmission of the information, the device may fragment the information into two or more information fragments.

In operation 2302, the device may generate a PDU including one of unfragmented information and a fragmented information fragment, and fragmentation information.

In operation 2304, the device may transmit the PDU through the unit transmission resource.

The fragmentation information may include FC information indicating at least one of whether the information is fragmented or not and a position of the fragmented information fragment included in the PDU within the two or more information fragments. The fragmentation information may further include an identifier of the device and an SN of one of the unfragmented information and the fragmented information fragment. The fragmentation information may be included in a header of the PDU.

The information may be discovery information transmitted by the device, and a unit transmission resource may be, or may include a discovery physical channel.

The PDU may further include a CRC part used for integrity check of one of the unfragmented information and the information fragment. The CRC part may be generated based on a previous information fragment or a next information fragment for the information fragment.

The SN may be uniquely assigned. Thus, the SN may be distinguished from all other information fragments that are transmitted during the at least one transmission time interval.

The transmission time interval may correspond to a subframe.

Figure 24:
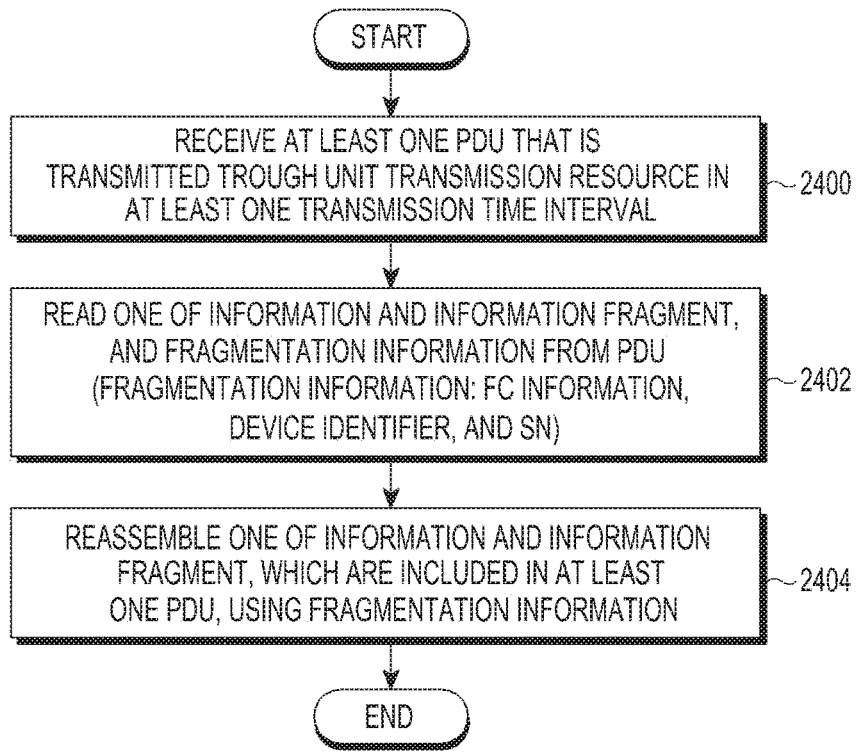
FIG. 24 illustrates a method of receiving information by a device according to the second method of the present disclosure.

FIG. 24 illustrates a method of receiving information by a device according to the second method of the present disclosure.

Referring to FIG. 24, in operation 2400, the device may receive at least one PDU that is transmitted through a unit transmission resource in at least one transmission time interval.

In operation 2402, the device may read one of information and an information fragment, and fragmentation information from the PDU.

In operation 2404, the device may reassemble one of the information and the information fragment, at least one of which is included in the at least one PDU, using the fragmentation information.

If a size of the information is greater than a transportable size of a unit transmission resource, the information may be fragmented into two or more information fragments and transmitted in a transmitting device.

The fragmentation information may include FC information indicating at least one of whether the information is fragmented or not and a position of the information fragment included in the PDU within the two or more information fragments. The fragmentation information may further include an identifier of the device, and an SN of one of the unfragmented information and the information fragment.

The information may be discovery information transmitted by the device, and the unit transmission resource may include a discovery physical channel.

The PDU may further include a CRC part used for integrity check of one of the unfragmented information and the information fragment. The CRC part may be generated based on a previous information fragment or a next information fragment for the information fragment.

The SN may be uniquely assigned. Thus, the SN may be distinguished from all other information fragments that are transmitted during the at least one transmission time interval.

The transmission time interval may correspond to a subframe.

Figure 25:
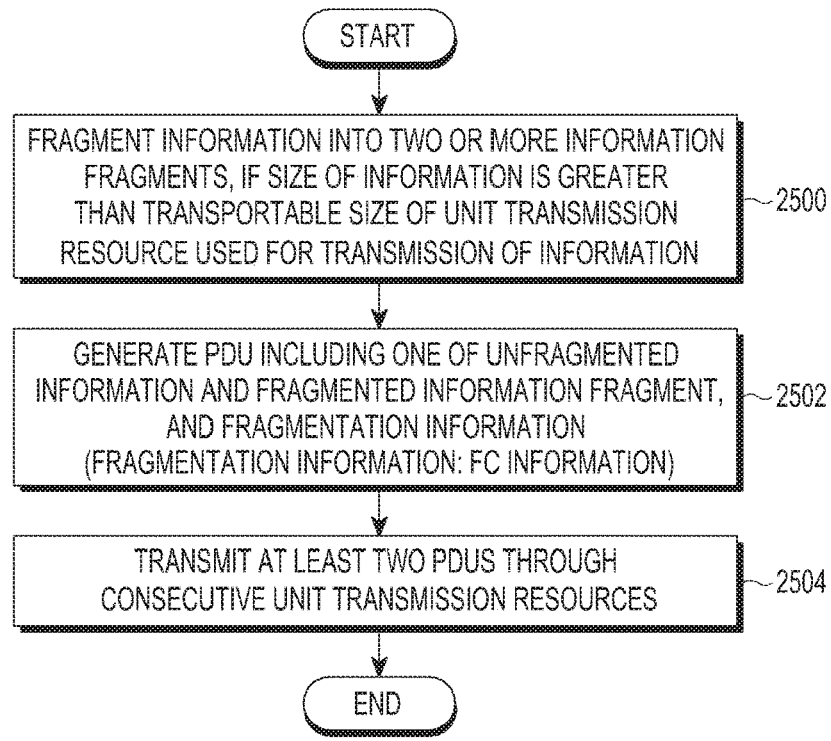
FIG. 25 illustrates a method of transmitting information by a device according to the third method of the present disclosure.

FIG. 25 illustrates a method of transmitting information by a device according to the third method of the present disclosure.

Referring to FIG. 25, in operation 2500, if a size of the information is greater than a transportable size of a unit transmission resource used for transmission of the information, the device may fragment the information into two or more information fragments.

In operation 2502, the device may generate a PDU including one of unfragmented information and a fragmented information fragment, and fragmentation information.

In operation 2504, the device may transmit at least two PDUs through consecutive unit transmission resources.

The fragmentation information included in the PDU may include FC information indicating at least one of whether the information is fragmented or not and a position of the fragmented information fragment included in the PDU within the two or more information fragments. The fragmentation information may be included in a header of the PDU.

The information may be discovery information transmitted by the device, and the unit transmission resources may include a discovery physical channel.

The transmission time interval may correspond to a subframe.

The consecutive unit transmission resources may be present in the same subframe, and be consecutive resources on the frequency axis. Alternatively, the consecutive unit transmission resources may be present in the same frequency band, and be resources which are located in consecutive subframes.

The FC information may indicate whether an information fragment included in the PDU is a first fragment, a middle fragment, or a last fragment.

Each of the two or more information fragments may be fragmented to have a size smaller than or equal to a transportable size of a unit transmission resource. Alternatively, the two or more information fragments may be fragmented such that each of the information fragments includes at least one of information fields included in the information.

The PDU may further include a CRC part used for integrity check of one of the unfragmented information and the information fragment. The CRC part may be generated based on a previous information fragment or a next information fragment for the information fragment.

Figure 26:
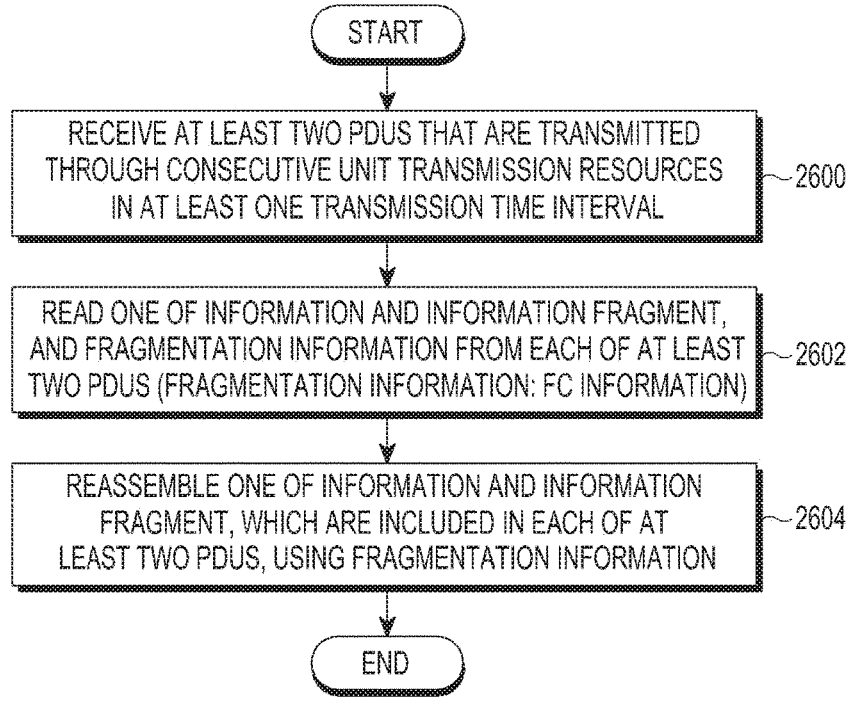
FIG. 26 illustrates a method of receiving information by a device according to the third method of the present disclosure.

FIG. 26 illustrates a method of receiving information by a device according to the third method of the present disclosure.

Referring to FIG. 26, in operation 2600, the device may receive at least two PDUs that are transmitted through consecutive unit transmission resources in at least one transmission time interval.

In operation 2602, the device may read one of information and an information fragment, and fragmentation information from each of the at least two PDUs.

In operation 2604, the device may reassemble one of the information and the information fragment, at least one of which is included in each of the at least two PDUs, using the fragmentation information.

If a size of the information is greater than a transportable size of a unit transmission resource, the information may be fragmented into two or more information fragments and transmitted in a transmitting device.

The fragmentation information may include FC information indicating at least one of whether the information is fragmented or not and a position of the information fragment included in the PDU within the two or more information fragments.

The information fragment included in each of the at least two PDUs may be an information fragment that is transmitted from one device.

The information may be discovery information transmitted by the device, and the unit transmission resource may include a discovery physical channel.

The transmission time interval may correspond to a subframe.

The consecutive unit transmission resources may be present in the same subframe, and be consecutive resources on the frequency axis. Alternatively, the consecutive unit transmission resources may be present in the same frequency band, and be resources which are located in consecutive subframes.

The FC information may indicate whether an information fragment included in the PDU is a first fragment, a middle fragment, or a last fragment.

Figure 27:
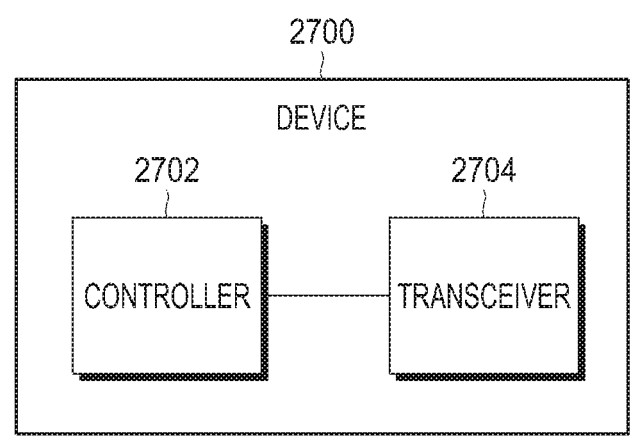
FIG. 27 illustrates a structure of a device for transmitting or receiving information according to the three methods of the present disclosure.

FIG. 27 illustrates a structure of a device for transmitting or receiving information according to the three methods of the present disclosure.

Referring to FIG. 27, the device 2700 may perform the information transmission or reception operation described in the present disclosure. For example, the device 2700 may be implemented to perform the information transmission and reception operations described in FIGS. 21 to 26.

The device 2700 may include a transceiver 2704 configured to transmit and receive signals over wireless channels, and a controller 2702 configured to control the transceiver 2704.

The controller 2702 may have a structure for performing all operations of the Tx UE, the Rx UE or the device, which have been described in the present disclosure.

The controller 2702 and the transceiver 2704 should not necessarily be implemented as separate components, and may be implemented as a single component such as a single chip.

It should be noted that the methods, the fragmentation information, the resource structures and the device structure illustrated in FIGS. 2 to 27 are not intended to limit the scope of the present disclosure. In other words, the specific values of fragmentation information, all of the components, or the operations, which have been described in FIGS. 2 to 27, should not be construed to be essential components for embodiments of the present disclosure, and the present disclosure may be implemented without departing from the scope and spirit of the present disclosure, by using only some of the components or applying other values.

The above-described operations may be implemented by mounting a memory device storing a program code in any component of a terminal device in a communication system. In other words, a controller of the terminal device may perform the above-described operations by reading and executing the program code stored in the memory device by means of a processor or a central processing unit (CPU).

Various components and modules of the terminal device, which are described therein, may be operated using a hardware circuit (e.g., a complementary metal oxide semiconductor (CMOS)-based logic circuit), firmware, software, and/or a hardware circuit such as a combination of hardware, firmware and/or software inserted into a non-transitory machine-readable medium. For example, various electrical structures and methods may be implemented using electrical circuits such as transistors, logic gates and application specific integrated circuits (ASICs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting data by a device in a wireless communication system supporting device to device communication, the method comprising:
    fragmenting the data into a plurality of fragments, if a size of the data is greater than a transportable size of a unit transmission resource to be used for transmission of the data;
    generating at least one protocol data unit (PDU), wherein each PDU includes:
        fragmentation information, and
        either unfragmented data or a fragment among the plurality of fragments; and
    transmitting the at least one PDU through at least one unit transmission resource,
    wherein the fragmentation information includes information indicating a unit transmission resource for transmission of the each PDU,
    wherein the information indicating the unit transmission resource indicates a unit transmission resource transmitting either a next fragment or a previous fragment, based on a position of the fragment,
    wherein the unit transmission resource is assigned in a transmission time interval among at least one transmission time interval, and
    wherein, if the fragmentation information indicates that the position of the fragment is a last position, the information indicating the unit transmission resource is an identity of a unit transmission resource transmitting a previous fragment.

2. The method of claim 1,
    wherein the data is discovery information transmitted by the device, and
    wherein the unit transmission resource among the at least one unit transmission resource corresponds to a discovery physical channel among at least one discovery physical channel.

3. The method of claim 1, wherein the fragmentation information further includes information indicating whether the data is fragmented or not.

4. The method of claim 3, wherein, if the fragmentation information indicates that the data is unfragmented, the information indicating the unit transmission resource is an identity of a unit transmission resource transmitting the data unfragmented.

5. The method of claim 3, wherein, if the fragmentation information indicates that the position of the fragment is a first position, the information indicating the unit transmission resource is an identity of a unit transmission resource transmitting a next fragment.

6. The method of claim 3, wherein, if the fragmentation information indicates that the position of the fragment is a middle position, the information indicating the unit transmission resource is an identity of a unit transmission resource transmitting a next fragment or a previous fragment.

7. The method of claim 1,
wherein the transmission time interval corresponds to a subframe, and
wherein if the data is transmitted in a plurality of subframes, the fragmentation information further includes a unique number of a subframe in which the unit transmission resource is located.

8. A method for receiving data by a device in a wireless communication system supporting device to device communication, the method comprising:
receiving at least one protocol data unit (PDU) that is transmitted through at least one unit transmission resource, wherein each PDU includes:
fragmentation information, and
either unfragmented data or a fragment among a plurality of fragments, the plurality of fragments fragmented being based on a transportable size of a unit transmission resource used for transmission of the data; and
reassembling the data included in the at least one PDU, based on the fragmentation information,
wherein the fragmentation information includes information indicating the unit transmission resource for transmission of the each PDU,
wherein the information indicating the unit transmission resource indicates a unit transmission resource transmitting either a next fragment or a previous fragment, based on a position of the fragment,
wherein the unit transmission resource is assigned in a transmission time interval among at least one transmission time interval, and
wherein, if the fragmentation information indicates that the position of the fragment is a last position, the information indicating the unit transmission resource is an identity of a unit transmission resource transmitting a previous fragment.

9. The method of claim 8,
wherein the data is discovery information transmitted by the device, and
wherein the unit transmission resource among the at least one unit transmission resource corresponds to a discovery physical channel among at least one discovery physical channel.

10. The method of claim 8, wherein the fragmentation information further includes information indicating whether the data is fragmented or not.

11. The method of claim 10, wherein, if the fragmentation information indicates that the data is unfragmented, the information indicating the unit transmission resource is an identity of a unit transmission resource transmitting the data unfragmented.

12. The method of claim 10, wherein, if the fragmentation information indicates that the position of the fragment is a first position, the information indicating the unit transmission resource is an identity of a unit transmission resource transmitting a next fragment.

13. The method of claim 10, wherein, if the fragmentation information indicates that the position of the fragment is a middle position, the information indicating the unit transmission resource is an identity of a unit transmission resource transmitting a next fragment or a previous fragment.

14. The method of claim 8,
wherein the transmission time interval corresponds to a subframe, and
wherein, if the data is transmitted in a plurality of subframes, the fragmentation information further includes a unique number of a subframe in which the unit transmission resource is located.

15. The method of claim 8, wherein the fragmentation information is included in a header of the each PDU.

16. The method of claim 8, wherein the each PDU further includes a cyclic redundancy check (CRC) part used for integrity check of one of the data unfragmented or the fragment.

17. The method of claim 16, wherein the CRC part is generated based on a previous fragment or a next fragment.

18. The method of claim 8, wherein the fragmentation information further includes an identifier of the device.

19. A device for transmitting data in a wireless communication system supporting device to device communication, the device comprising:
a controller configured to:
fragment the data into a plurality of fragments if a size of the data is greater than a transportable size of a unit transmission resource to be used for transmission of the data, and
generate at least one protocol data unit (PDU), wherein each PDU includes:
fragmentation information, and
either unfragmented data or a fragment among the plurality of fragments; and
a transceiver configured to transmit the at least one PDU through at least one unit transmission resource,
wherein the fragmentation information includes information indicating a unit transmission resource for transmission of the each PDU,
wherein the information indicating the unit transmission resource indicates a unit transmission resource transmitting either a next fragment or a previous fragment, based on a position of the fragment,
wherein the unit transmission resource is assigned in a transmission time interval among at least one transmission time interval, and
if the fragmentation information indicates that the position of the fragment is a last position, the information indicating the unit transmission resource is an identity of a unit transmission resource transmitting a previous fragment.

20. A device for receiving data in a wireless communication system supporting device to device communication, the device comprising:
a transceiver configured to receive at least one protocol data unit (PDU) that is transmitted through at least one unit transmission resource, wherein each PDU includes:
fragmentation information, and
either unfragmented data or a fragment among a plurality of fragments, the plurality of fragments fragmented being based on a transportable size of a unit transmission resource used for transmission of the data; and a controller configured to reassemble the data included in the at least one PDU, based on the fragmentation information, wherein the fragmentation information includes information indicating the unit transmission resource for transmission of the each PDU, wherein the information indicating the unit transmission resource indicates a unit transmission resource transmitting either a next fragment or a previous fragment, based on a position of the fragment, wherein the unit transmission resource is assigned in a transmission time interval among at least one transmission time interval, and wherein, if the fragmentation information indicates that the position of the fragment is a last position, the information indicating the unit transmission resource is an identity of a unit transmission resource transmitting a previous fragment.

* * * * *